United States Patent
Larkin et al.

(10) Patent No.: US 9,481,243 B2
(45) Date of Patent: Nov. 1, 2016

(54) TRACTION CONTROL SYSTEM FOR 4WD/AWD VEHICLES EQUIPPED WITH ONBOARD CAMERA

(71) Applicant: Magna Powertrain of America, Inc., Troy, MI (US)

(72) Inventors: Bradley R. Larkin, Shelby Township, MI (US); Johannes Quehenberger, Saalbach (AT)

(73) Assignee: Magna Powertrain of America, Inc., Troy, MI (US)

( * ) Notice: Subject to any disclaimer, the term of this patent is extended or adjusted under 35 U.S.C. 154(b) by 77 days.

(21) Appl. No.: 14/331,365

(22) Filed: Jul. 15, 2014

(65) Prior Publication Data

US 2015/0019094 A1 Jan. 15, 2015

Related U.S. Application Data

(60) Provisional application No. 61/846,258, filed on Jul. 15, 2013.

(51) Int. Cl.
*B60W 40/064* (2012.01)
*B60K 23/08* (2006.01)

(52) U.S. Cl.
CPC ........... *B60K 23/08* (2013.01); *B60K 23/0808* (2013.01); *B60W 40/064* (2013.01); *B60K 2023/085* (2013.01); *B60K 2023/0858* (2013.01); *B60W 2550/148* (2013.01)

(58) Field of Classification Search
None
See application file for complete search history.

(56) References Cited

U.S. PATENT DOCUMENTS

| | | | | |
|---|---|---|---|---|
| 4,552,241 A | * | 11/1985 | Suzuki | B60K 23/0808 180/197 |
| 4,712,635 A | * | 12/1987 | Sumiya et al. | B60K 23/08 180/197 |
| 5,984,034 A | * | 11/1999 | Morisawa et al. | B60K 6/48 180/65.28 |
| 6,094,614 A | | 7/2000 | Hiwatashi | |
| 6,807,473 B1 | | 10/2004 | Tran | |
| 7,702,446 B2 | | 4/2010 | Hiwatashi | |
| 8,095,287 B2 | | 1/2012 | Beechie et al. | |
| 8,165,767 B2 | | 4/2012 | Zalewski et al. | |
| 8,204,657 B2 | | 6/2012 | Buszek et al. | |
| 8,306,672 B2 | | 11/2012 | Nickolaou | |
| 8,313,407 B2 | | 11/2012 | Ekonen et al. | |
| 8,436,902 B2 | | 5/2013 | Kuehnle | |
| 8,608,611 B2 | | 12/2013 | Ekonen et al. | |
| 2009/0076696 A1 | * | 3/2009 | Perkins et al. | B60K 23/08 701/69 |
| 2010/0094519 A1 | * | 4/2010 | Quehenberger et al. | B60K 17/35 701/69 |
| 2012/0095659 A1 | | 4/2012 | Rodrigues et al. | |
| 2013/0226421 A1 | * | 8/2013 | Horaguchi et al. | B60K 17/344 701/67 |
| 2015/0032335 A1 | * | 1/2015 | Kodama et al. | B60W 10/20 701/42 |

* cited by examiner

*Primary Examiner* — Justin Holmes
(74) *Attorney, Agent, or Firm* — Dickinson Wright PLLC

(57) ABSTRACT

A method controls a powertrain that directs power from an engine and a transmission to all four wheels or to just front wheels or to just rear wheels. The method includes monitoring information transmitted over a communications network. The method determines whether one or more components of the powertrain are in an active condition or in an inactive condition. The one or more components of the powertrain are in the inactive condition when not connected to the transmission and not connected to the front wheels or the rear wheels. The one or more components of the powertrain are in the active condition when connected to the transmission and connected to the front wheels and the rear wheels. The method switches the one or more components of the powertrain between the inactive condition and the active condition based at least in part on visual data provided by an on-board camera system.

20 Claims, 18 Drawing Sheets

TRACTION CONTROL SYSTEM FOR 4WD/AWD VEHICLES EQUIPPED WITH ONBOARD CAMERA

RELATED APPLICATION

The subject application claims priority to U.S. Provisional Patent Application Ser. No. 61/846,258 filed on Jul. 15, 2013 and entitled a "Traction Control System for 4WD/AWD Vehicles Equipped with Onboard Camera".

FIELD

The present disclosure relates generally to vehicular traction control systems. More specifically, the present disclosure relates to a vehicular traction control system operable for selectively connecting and disconnecting driveline components of an AWD/4WD vehicle based on one or more ambient conditions or road conditions detected by an onboard camera system.

BACKGROUND

This section provides background information related to the present disclosure that is not necessarily prior art.

Many modern automotive vehicles are equipped with torque transfer systems configured to normally direct drive torque from a powertrain to a set of primary wheels and which can selectively or automatically direct a portion of the drive torque from the powertrain to a set of secondary wheels. Such torque transfer systems, commonly referred to as four-wheel drive or all-wheel drive, can be based on either of a front-wheel drive (FWD) vehicle architecture or a rear-wheel drive (RWD) vehicle architecture. In many vehicles, the torque transfer system operates primarily in a two-wheel drive mode (2WD) for normally driving the primary wheels while the secondary wheels are selectively connected to the powertrain to define a four wheel drive mode (4WD) or an all-wheel drivemode (AWD) only when improved traction is warranted. When operating in the 2WD mode, the secondary wheels are typically disconnected from the powertrain to maximize fuel economy. Various disconnect systems are known for selectively and/or automatically disconnecting the secondary wheels and/or interconnected secondary driveline components in both traditional FWD and RWIF vehicle architectures. For example, commonly owned U.S. Pat. No. 8,165,767 titled "Traction Control System for 4WD/AWD Vehicles"; U.S. Pat. No. 8,313,407 titled "Power Take-Off Unit with Active Coupling and Hypoid Disconnect System"; and U.S. Published Application No. US2011/0275470 titled "AWD Vehicle with Disconnect System" all provide disclosure of disconnect systems and are all incorporated herein in their entirety by reference.

In addition to the need for shifting between the 2WD and 4WD/AWD modes for purposes of improved traction and improved fuel economy, a challenge exists regarding the time needed to switch from the 2WD mode into the 4WD/AWD mode upon detection of conditions warranting enhanced traction control. For example, an undesirable time delay may be required to synchronize and engage the secondary driveline components with the powertrain while the motor vehicle is operating during a wheel slip condition. This is based on the fact that many current torque transfer systems operated based on reaction to detection of a wheel slip condition. Accordingly, a need exists in the art for 4WD/AWD torque transfer systems that are configured and operable to preemptively shift into the 4WD/AWD mode prior to the occurrence of wheel slip. In this regard, it may be beneficial to provide a system operable to estimate the types of road surface and conditions in combination with other vehicular and accessory operating conditions to switch the vehicle into its 4WD/AWD mode prior to the occurrence of wheel slip.

SUMMARY

This section provides general summary of the disclosure, and is not a comprehensive disclosure of its full scope or all of its features, aspects or objectives.

According to one aspect of the present disclosure, a method is provided for controlling a traction control system in a motor vehicle utilizing information based on any one of a plurality of vehicle operating conditions, road conditions and weather conditions.

According to another aspect of the present disclosure, the method for controlling a vehicular traction control system utilizes visual information from a camera system, which may include an onboard camera and image processing unit, to assist in controlling torque transfer between a powertrain and first and second drivelines. This visual information may be used, for example, to identify road surface materials, road patterns, and road markings as well as to identify the position, speed, number and/or proximity of other vehicles.

According to yet another aspect of the present disclosure, the visual information generated by the camera system may be combined with other data available via the vehicle's communication network to optimize performance of the 2WD-4WD/AWD shift control logic.

In accordance with these and other aspects, a method in accordance with at least one embodiment of the present disclosure is provided for controlling a drivetrain of a vehicle and includes collecting visual data from an onboard camera and image processing unit as the vehicle travels across a road surface. The visual information is analyzed to determine an "aspect" of the road surface. This aspect may include identification of the type of road surface (i.e., concrete, asphalt, gravel, etc.), the frictional condition of the road surface (i.e., dry, wet, snow covered, icy, etc.), and a surface condition of the road surface (i.e. potholes, dents, ruts, rails, tracks, etc.). The drivetrain is preemptively shifted from its 2WD mode into its 4WD/AWD mode prior to a wheel slip occurrence based on the analysis of the visual information.

In accordance with these and other aspects, a method in accordance with at least one embodiment of the present disclosure is provided for controlling the transmission of drive torque from a powertrain to only the primary wheels or to both the primary and secondary wheels. The method includes monitoring information transmitted over a communication network and determining whether one or more components of the secondary driveline are in an "active" condition or an "inactive" condition. The component(s) are in the inactive condition when disconnected from a torque transferring connection with the powertrain and are in the active condition when such a torque transferring connection is established. The method is directed to shifting the component(s) of the secondary driveline between the inactive and active conditions based on information from the communication network including visual data related to at least one of road types, road conditions, vehicle proximity and weather conditions generated by an onboard camera and image processing unit.

In accordance with these and other aspects, a method in accordance with at least one embodiment of the present disclosure is provided for controlling a drivetrain of a vehicle by estimating a road surface material, condition and/or type based on visual data, determining vehicle operating parameters and modifying the likelihood of operating the vehicle in a 4WD/AWD mode based on the road estimate and the vehicle operating parameters.

In accordance with these and other aspects, a drivetrain is provided for a 4WD/AWD vehicle having a torque transfer arrangement and a disconnect arrangement, at least one of which is controlled using visual data generated by an onboard camera system.

Further areas of applicability will become apparent from the description provided herein. The description and specific exemplary embodiments in this summary are intended for purposes of illustration only and are not intended to limit the scope of the present disclosure.

DRAWINGS

The drawings described herein are for purposes of illustration only of selected embodiments and not all possible implementations, and the drawings are not intended to limit the scope of the present disclosure.

Corresponding reference numerals indicate corresponding parts throughout the several views of the drawings.

DETAILED DESCRIPTION

Example embodiments will now be more fully described with reference to the accompanying drawings. However, the following description is merely exemplary in nature and is not intended to limit to present disclosure; its subject matter, applications or uses.

Example embodiments are provided so that this disclosure will be thorough, and will fully convey the scope to those who are skilled in the art. Numerous specific details are set forth such as examples of specific components, devices, and methods, to provide a thorough understanding of embodiments in many different forms and that neither should be construed to limit the scope of the disclosure. In some example embodiments, well-known processes, well-known device structures, and well-known technologies are not described in detail.

In general, the present disclosure relates to a traction control system for use in conjunction with a disconnect system within the drivetrain of a four-wheel drive (4WD) motor vehicle or an all-wheel drive (AWD) motor vehicle. More specifically, the present disclosure relates to an automatic disconnect control strategy for selectively connecting and disconnecting a secondary driveline to a powertrain. As will be detailed further hereinafter, the disconnect control strategy is operable to monitor multiple vehicle operating parameters and/or characteristics including a road analysis status based on visual data provided by an onboard camera system. The disconnect control strategy uses the visual data to assist in controlling selective engagement and disengagement of at least one disconnect device or torque transfer clutch for controlling the transfer of drive torque from the powertrain to the secondary driveline.

Figure 1:
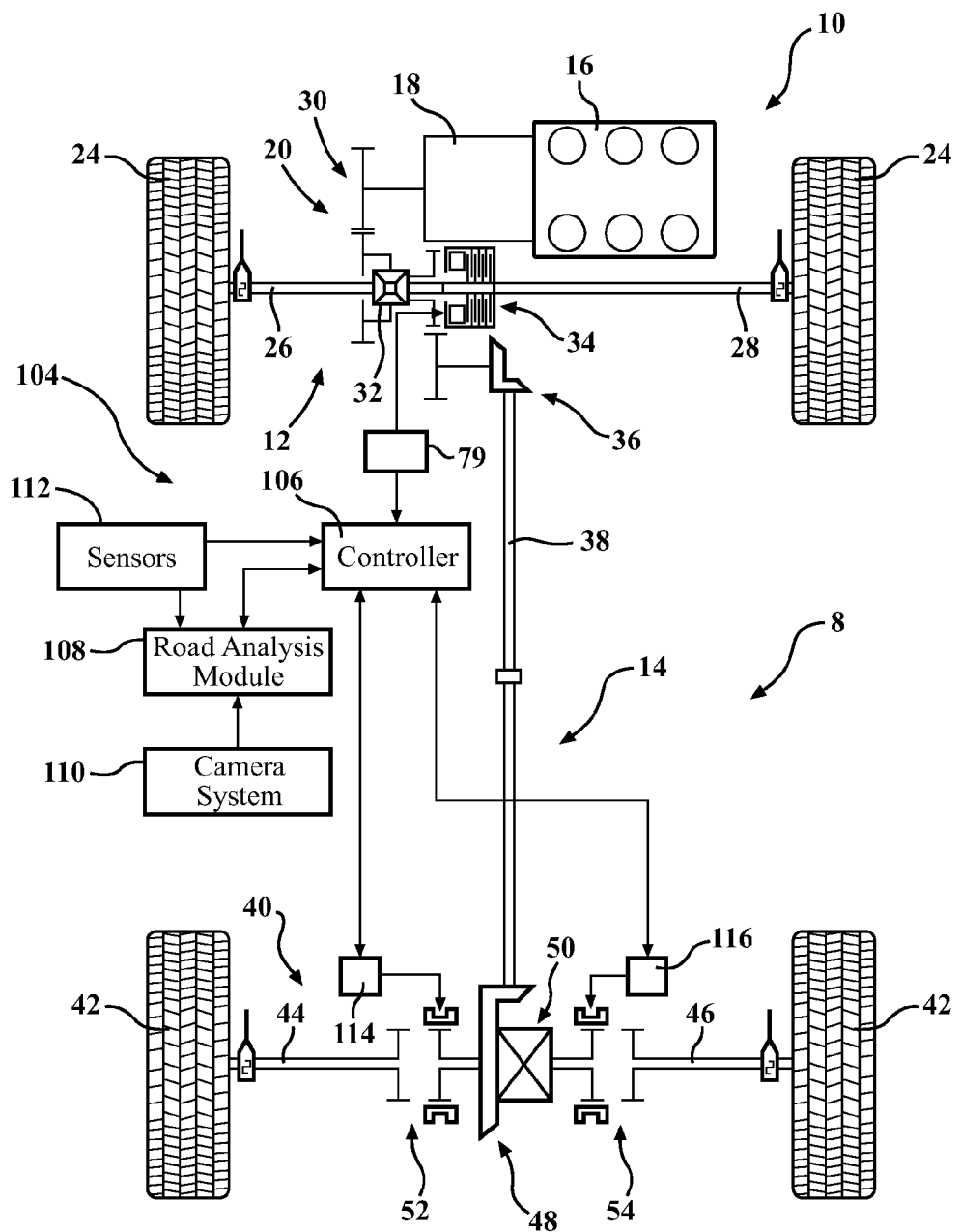
FIG. 1 is a schematic of an exemplary motor vehicle equipped with a traction control system of the present disclosure.

With particular reference to FIG. 1 of the drawings, a drivetrain 10 of an exemplary all-wheel drive motor vehicle 8 is shown. Drivetrain 10 includes a first or primary driveline 12 and a second or secondary driveline 14, both drivable from a source of power, such as a powertrain having an engine 16 and a transmission 18 which may be of either the manual or automatic type. In the particular embodiment shown, drivetrain 10 is an all-wheel drive (AWD) arrangement incorporating a power transmission device 20 for transmitting drive torque from the powertrain to primary driveline 12 and secondary driveline 14. Power transmission device 20 is shown as a power take-off unit.

Primary driveline 12 is a front driveline which is shown to include a pair of front wheels 24 individually driven by a first front axleshaft 26 and a second front axleshaft 28. Power take-off unit 20 may include a reduction speed gearset 30, a front differential assembly 32, an active clutch 34, and a right-angled drive assembly 36.

Secondary driveline 14 is a rear driveline which includes a propeller shaft 38 connected at one end to right-angled drive assembly 36 and at an opposite end to a rear axle assembly 40. Rear driveline 14 also includes a pair of rear wheels 42 individually driven by a first rear axleshaft 44 and a second rear axleshaft 46. Rear axle assembly 40 may also include a hypoid ring and pinion gearset 48 driving a rear differential assembly 50. First and second disconnect devices 52 and 54, respectively, are provided for selectively drivingly connecting and disconnecting first and second rear axleshafts 44, 46 relative to rear differential assembly 50. Each disconnect device 52, 54 is operable in a first or "active" mode to drivingly interconnect a corresponding one of the rear axleshafts 44, 46 to a corresponding output component of rear differential assembly 50 so as to establish a drive connection between rear wheels 42 and prop shaft 38. Likewise, each disconnect device 52, 54 is operable in a second or "inactive" mode to disconnect rear axleshafts 44, 46 from the output components of rear differential assembly 50. While disconnect devices 52, 54 are illustrated as sliding dog-type clutches, those skilled in the art will recognize that this configuration is merely exemplary of any type of dual mode clutching arrangement.

Figure 2:
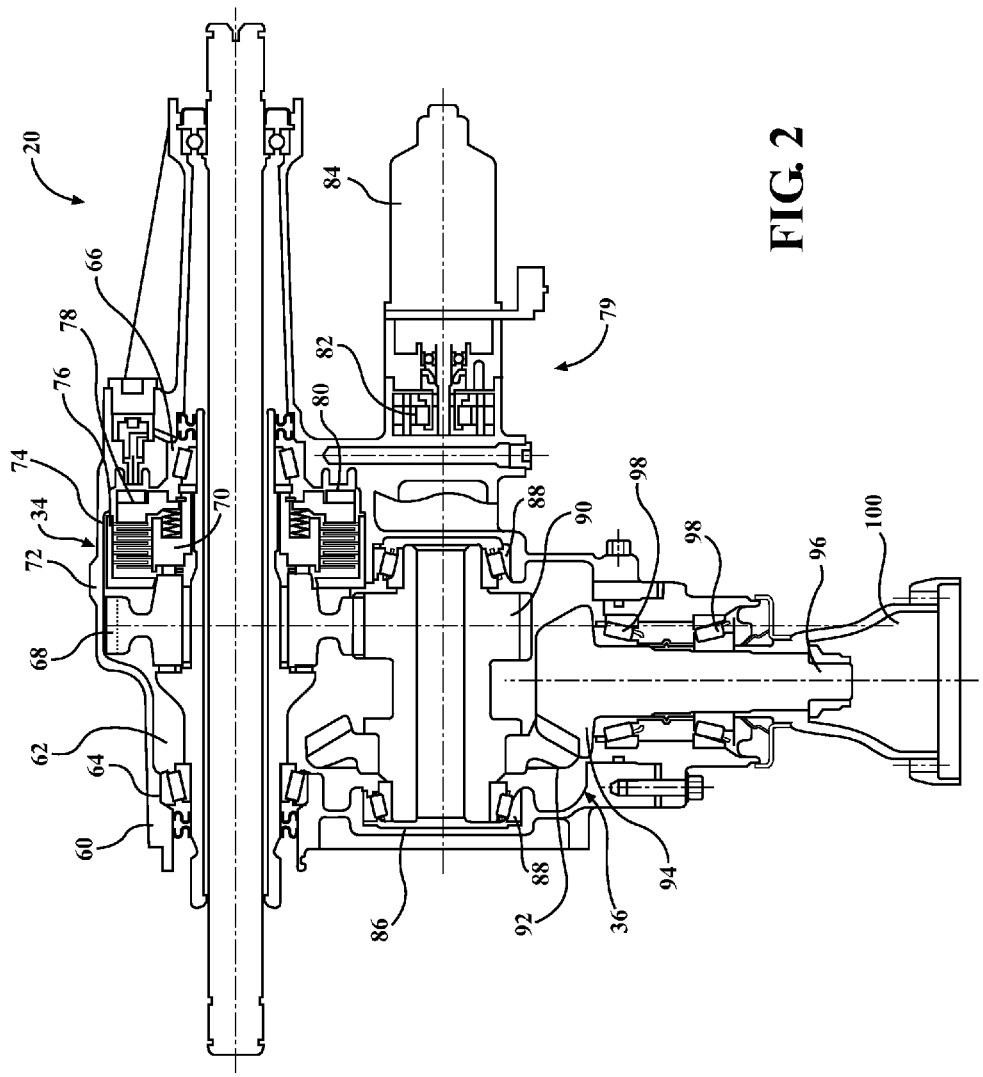
FIG. 2 is a fragmentary sectional view of an exemplary embodiment of a power take-off unit associated with the traction control system of FIG. 1.

FIG. 2 depicts an exemplary embodiment of power take-off unit 20 in greater detail. A housing 60 supports an input shaft 62 for rotation via bearings 64 and 66. Input shaft 62 is adapted to be driven by reduction gearset 30. Likewise, a differential case of front differential assembly 32 is also adapted to be driven by reduction gearset 30. A drive gear 68 is supported for rotation on input shaft 62. Active clutch 34 is operable to selectively drivingly interconnect input shaft 62 and drive gear 68. Clutch 34 includes a hub 70 fixed for rotation with input shaft 62 and a drum 72 fixed for rotation with drive gear 68. A plurality of outer clutch plates 74 are fixed for rotation with drum 72. A plurality of inner clutch plates 76 are fixed for rotation with hub 70 and are interleaved with outer clutch plates 74. An apply plate 78 is axially translatable to apply a clutch actuation force to clutch plates 74, 76 and transfer torque through clutch 34. An type power-operated clutch actuator can be provided for moving apply plate 78 and regulating the torque transfer across clutch 34. An exemplary poweroperated clutch actuator 79 is shown to include an axially moveable piston 80 in receipt of pressurized fluid provided by a fluid pump 82 which is driven by an electric motor 84.

A countershaft 86 is rotatably supported in housing 60 by a pair of bearings 88. Countershaft 86 includes a driven gear 90 integrally formed thereon which is in driving meshed engagement with drive gear 68. Right-angled drive assembly 36 includes a hypoid ring gear 92 fixed for rotation with countershaft 86 and a pinion gear 94 in meshed engagement with ring gear 92. Pinion gear 94 is integrally formed with a pinion shaft 96 supported for rotation in housing 60 by a pair of bearings 98. Pinion shaft 96 is fixed for rotation with propeller shaft 38 via a flange 100.

In operation, active clutch 34 may be placed in an engaged or activated mode where drive torque is transferred between input shaft 62 and drive gear 68. Depending on the fluid pressure generated by pump 82, the magnitude of the drive torque transferred by clutch 34 may be varied. Accordingly, the quantity of torque transferred to rear driveline 14 may also be varied. Clutch 34 is also operable in a released or deactivated mode where no torque is transferred to rear driveline 14. To completely isolate right-angled drive assembly 36 and ring and pinion gearset 48 from a torque input, active clutch 34, first disconnect device 52 and second disconnect device 54 are each controlled to not transfer torque. As such, drive torque from the powertrain is not transferred to right-angled drive assembly 36 when active clutch 34 is in its deactivated mode. Similarly, rear wheels 42 do not "back drive" ring and pinion gearset 48 and rear differential assembly 50 when disconnect devices 52, 54 are released.

It should be appreciated that the AWD drivetrain depicted in FIG. 1 is merely exemplary and that any number of drivetrain configurations may be chosen to cooperate with the all-wheel-drive control system of the present disclosure. In particular, it is contemplated that a rear-wheel drive based vehicle equipped with a typical transfer case having a clutch for selectively transferring and ceasing the transfer of torque to a front drive axle assembly may cooperate with the control system to transfer torque to the front wheels based on an evaluation of the road condition. Even more broadly, the AWD control system may be used in any vehicle drivetrain having a disconnect device or torque clutch for interrupting the transfer of torque to one or more of the driven wheels.

As additionally shown in FIG. 1, a control system 104 may include a controller 106 in communication with a road analysis module 108. A camera system 110 is mounted to vehicle 8. Camera system 110 may include one or more cameras mounted to a front, side or rear portion of vehicle 8 and an image processing unit. Alternately, similar "visual" data may be acquired from one or more cameras located elsewhere on vehicle 8. The image processing unit provides the visual (digital) data to road analysis module 108. The cameras may form a part of another vehicle control system (such as an accident avoidance system) and road analysis module 108 may be provided data from the other system or systems. Using the data provided by camera system 110, a comparison, analysis or calculation is made to determine certain "conditions" of the road. Controller 106 may also be operable to actuate clutch 34, first disconnect device 52 and/or second disconnect device 54 to preemptively place drivetrain 10 in the AWD mode to prevent, correct or control a skid or wheel slip condition in response to the visual information provided by camera system 110.

Furthermore, it may be advantageous to reduce the churning losses associated with driving ring and pinion gearset 48 and right-angled drive assembly 36 to increase vehicle fuel efficiency. Controller 106 and road analysis module 108 may be in communication with a variety of additional sensors 112 providing data indicative of parameters such as vehicle speed, 2WD or 4WD drive mode status, wheel slip, vehicle acceleration and the like. At the appropriate time, controller 106 outputs a signal to clutch actuator 79 to place clutch 34 in the deactuated mode where drive torque is not transferred from the powertrain to rear driveline 14. Controller 106 may also signal power-operated actuators 114 and 116 respectively associated with first disconnect device 52 and second disconnect device 54 to cease the transfer of torque across these mechanisms such that energy associated with rotating rear wheels 42 will not be transferred to ring and pinion gearset 48 or rear differential assembly 50. At this time, the hypoid gearsets do not rotate at the rotational output speed of front differential assembly 32, nor do they rotate at the rotational speed of rear wheels 42. As such, the hypoid gearsets are disconnected from all sources of power and not driven thereby increasing the energy efficiency of drive train 10.

AWD control system 104 may be a standalone system where the only extra data input provided is the road surface condition provided by camera system 110 to road analysis module 108. Alternatively, an integrated system may be formed combining a traction control or vehicle stability system with an additional input for preemptive vehicle control. When integrated as part of the vehicle stability system, road analysis module 108 assists controller 106 in determining the optimal tractive forces at each wheel. The stability system may be triggered by several events as the vehicle reaches its tractive limit. For example, road analysis module 108 may output a signal indicative of the coefficient of static friction between the road surface and the tire. By estimating the coefficient of static friction between the road surface and the tire, the relationship between the normal load on the tire and the maximum force that may applied to the tire prior to a skid may be determined. Two-wheel drive (2WD) or all-wheel drive (AWD) modes may be entered depending on such calculation.

Road analysis module 108 is capable of detecting differences in road types. For example, roads may be concrete paved, asphalt paved, graded dirt, shell paved or gravel. Road analysis module 108 is operable to differentiate one type of road from another. Using this information, controller 106 may control activation of disconnect devices 52, 54 as well as vary the amount of drive torque provided by clutch 32 to rear driveline 14. If a gravel road condition is determined, controller may cause drivetrain 10 to operate in its AWD mode. Visual data from camera system 110 may be used to determine a road surface "material" (i.e., concrete, asphalt, gravel, sand) which can be useful in estimating or determining the frictional coefficient of the road surface. The visual data from camera system 110 may also be used to determine a road "pattern" (i.e., potholes, dents, rails, tracks, etc.) and/or road "markings" (i.e., rumble strips, reflective lane lines and markers, etc.). In addition, visual data from camera system 110 may be useful in identifying the position, speed and plurality of other vehicles in close proximity to vehicle 8. Finally, the visual data from camera system 110 may also be used to determine a road "condition" (i.e., dry, wet, snow covered, icy, etc.).

The output of road analysis module 108 may also provide a signal to controller 106 for determining a mode of operating drivetrain 10 during adaptive braking and/or anti-lock braking modes. Furthermore, road analysis module 108 may recognize surface irregularities caused by "rumble strips" installed on most major highways. Controller 106 may determine how often the vehicle is traveling over the rumble strip and the duration of time that the vehicle remains on the rumble strip. This information may be used to recognize a sleeping or inattentive driver. Controller 106 may communicate with auxiliary vehicle systems including a driver information center, or a vehicle readiness system, to more closely monitor traction loss, sudden direction changes, air bag deployment and/or a speed reduction.

Figure 3:
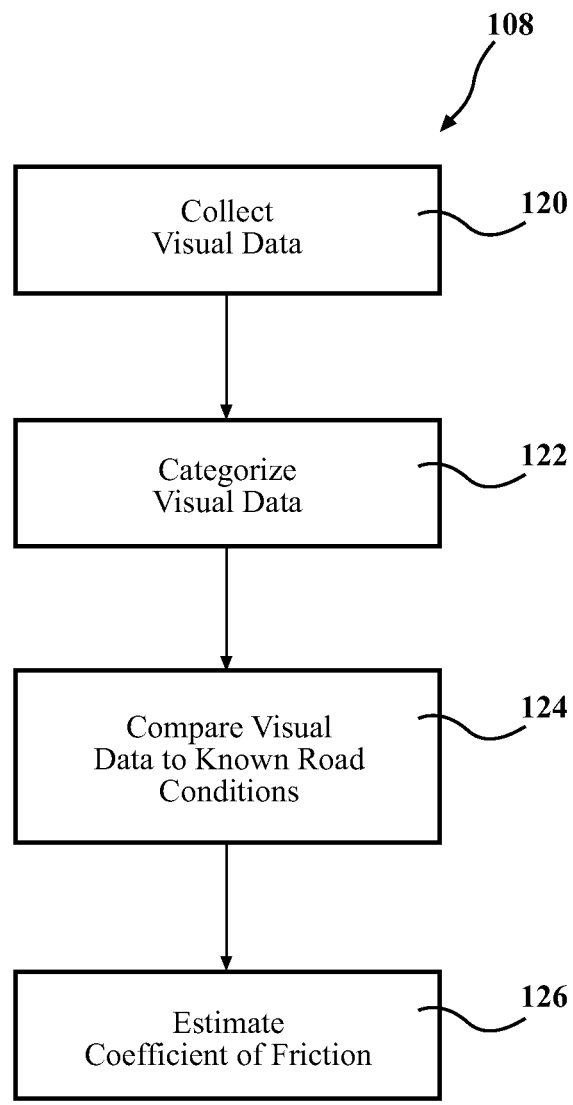
FIG. 3 is a logic diagram related to the function of a road analysis module associated with the traction control system of FIG. 1.

FIG. 3 illustrates at block 120 that road analysis module 108 is operable to collect visual data. At block 122, the visual data is categorized in distinct types of images relating, for example, to the road material, the road pattern, the road markings and the road condition. An analysis of distinct types of visual images is made at block 124 in comparison to previously collected road sample images to assist in identifying the current road status. Based on this visual data comparison, a bias toward operation of vehicle 8 in its 2WD modes or its AWD mode is determined as transmitted from road analysis module 108 to controller 106.

After the visual images have been compared and the most likely match has been chosen, road analysis module 108 outputs an estimated coefficient of friction between the vehicle tires and the road surface based on previously obtained test data. The coefficient of friction is estimated at block 126.

Once road analysis module 108 has estimated the coefficient of friction between a tire and the road surface and determined if regular disturbances such as those found on gravel or dirt roads exist, controller 106 may be used to urge drive-train 10 toward more frequent two-wheel drive operation or more frequent all-wheel drive operation. Assuming the vehicle operation begins in a native control mode, various driver controls, system sensors, CAN system module commands and signals from road analysis module 108 are considered by controller 106 to bias the tendency of vehicle operation toward a two-wheel drive mode or toward a four-wheel drive mode.

Figure 4:
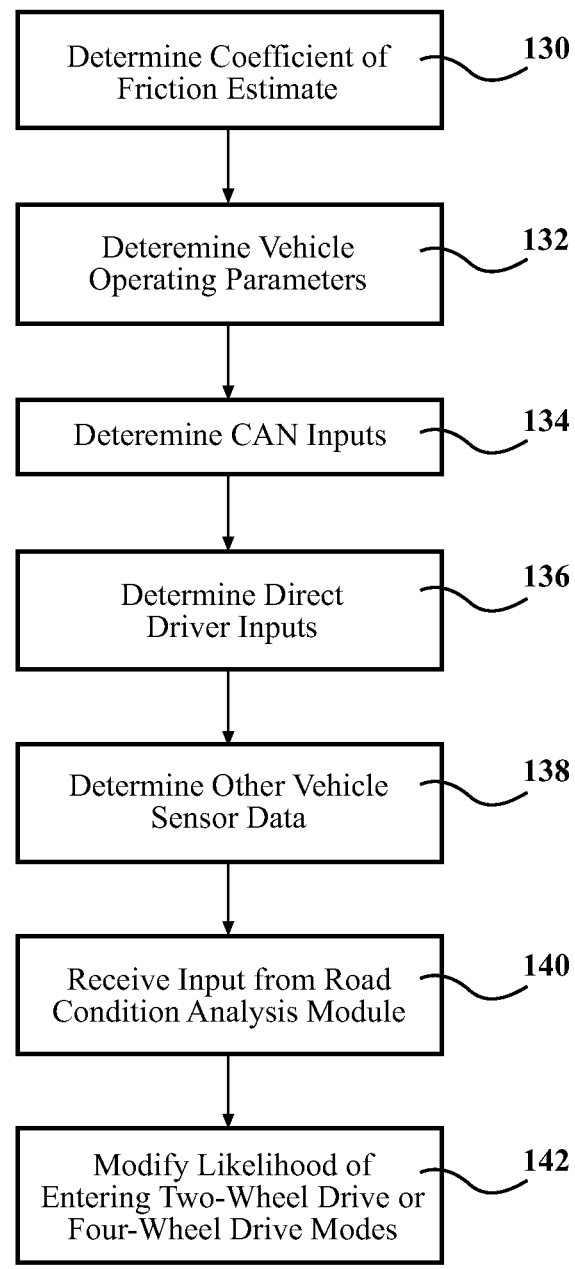
FIG. 4 depicts an exemplary logic diagram relating to the traction control system.

FIG. 4 shows controller 106 in receipt of the coefficient of friction previously estimated by road analysis module 108 at block 130. At block 132, vehicle operating parameters including cruise control activation state, windshield wiper operation, window position, sunroof position and rear window position may be considered. CAN system module commands may include determining if the stability system has been activated or if the engine torque output is being controlled by commands other than the accelerator pedal position. The CAN inputs are determined at block 134. Direct driver control inputs are determined at block 136 and may include an all-wheel drive system lock, a vehicle stability system enablement or disablement or a vehicle towing mode switch being activated. At block 138, other vehicle system sensor outputs are determined and may include an intake air temperature, a steering angle, vehicle lateral acceleration, throttle position, vehicle speed and rain sensor output. Road analysis module 108 may provide data relating to the road surface coefficient of friction, the road type, wheel slip and if precipitation has been estimated at block 140. Based on some or all of the inputs previously listed, controller 106 may modify the conditions requisite to entering either of the two wheel or all-wheel drive modes to bias one drive mode as more likely than the other at block 142. Controller 106 may immediately determine if it is necessary to preemptively respond to avoid wheel slip or if a more efficient two-wheel drive mode of operation is preferred.

Figure 5:
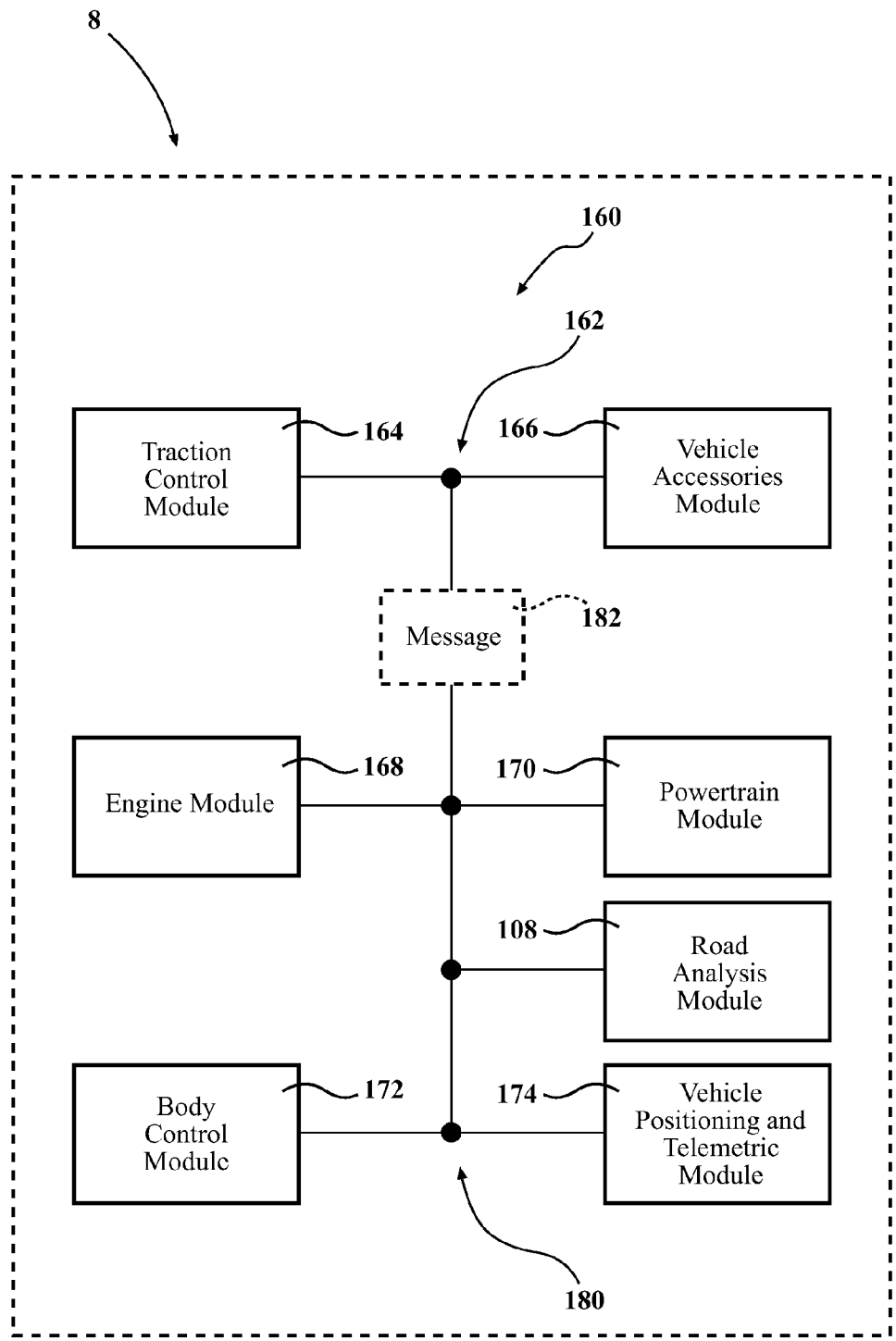
FIG. 5 is a diagram of the traction control system for the vehicle shown in FIG. 1 illustrating the road analysis module communicating with other modules over a communication network.

With reference to FIG. 5, the present teachings can generally include a traction control system 160 that can determine whether to uncouple or couple, thus switch between an "inactive" condition or an "active" condition, one or more drivetrain components based on ambient conditions, road conditions and/or changes to one or more vehicle systems. In this regard, traction control system 160 can uncouple the drivetrain components and place the components in an inactive condition. The inactive condition can be a condition in which one or more drivetrain components is not transmitting rotary power. In the inactive condition, power consumption of the powertrain can be reduced. On the other hand, the traction control system 160 can re-couple and engage the components placing the drivetrain components in an active condition. The active condition can be a condition in which one or more drivetrain components is transmitting rotary power. The traction control system 160 can automatically switch the one or more drivetrain components into the active condition or the inactive condition automatically without intervention from a user.

The traction control system 160 can include a communications network, such as a system bus 162, on which the following modules can communicate: a traction control module 164, a vehicle accessories module 166, an engine module 168, a powertrain module 170, a body control module 172 and a vehicle positioning and telemetric module 174 in addition to road analysis module 108. The modules, collectively referred to as "modules 180," can communicate with one another on the system bus 162 by sending digital messages 182 over the system bus 162 integrated in vehicle 8. In a repair or aftermarket situation, for example, one or more external devices can communicate with the modules 180 on the system bus 162 and/or other suitable communications networks.

Figure 6:
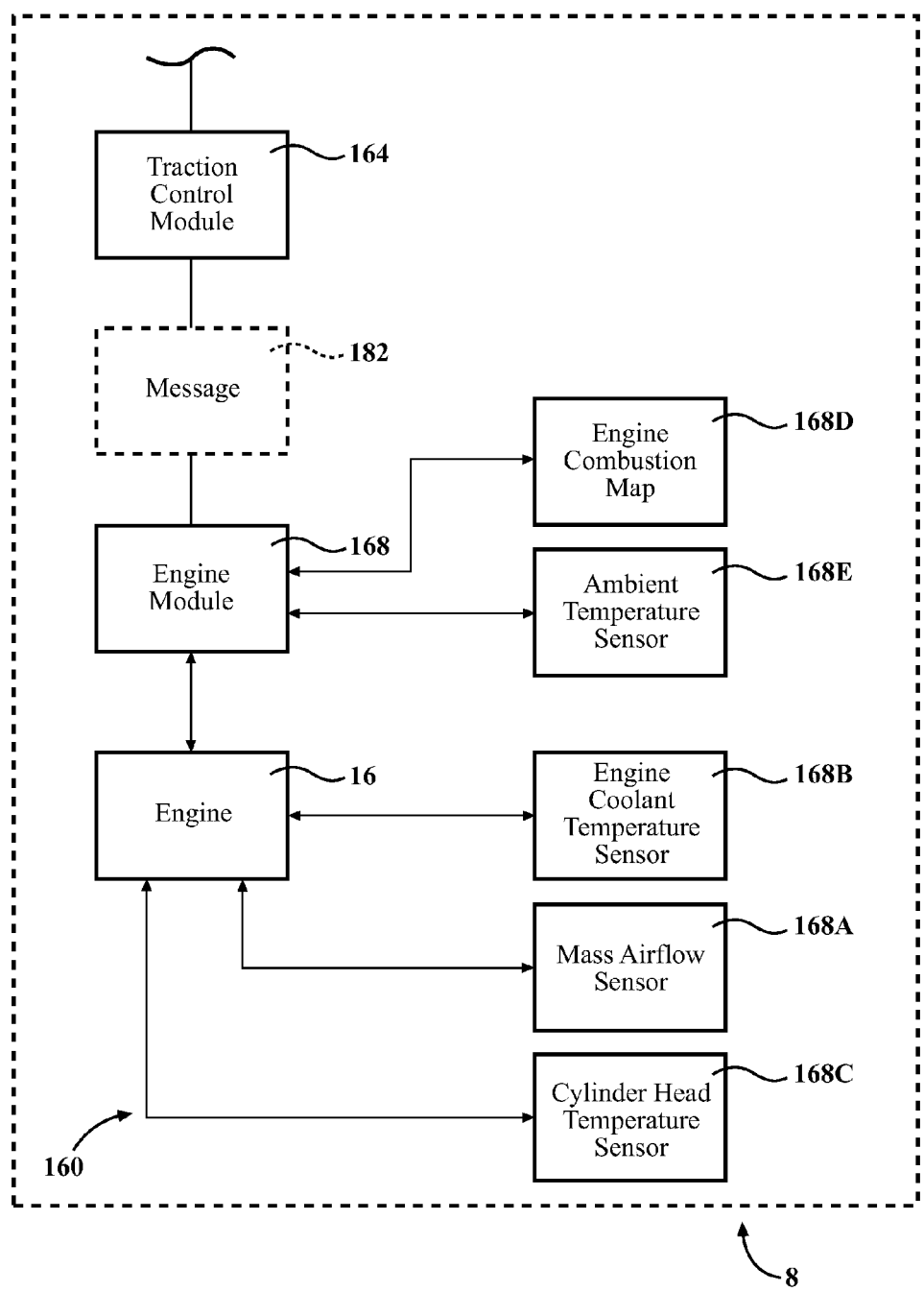
FIG. 6 is a diagram of the engine module of FIG. 5 communicating with an internal combustion engine and various sensors and systems of the motor vehicle.

With reference to FIG. 6, the engine module 168 can connect to or communicate with engine 16 of vehicle 8. The engine 16 can have a mass airflow sensor 168A that can measure airflow into the engine 16. Information from the mass airflow sensor 168A can relate to load on the engine 16, as is known in the art. The engine module 168 can also connect to an engine coolant temperature sensor 168B and a cylinder head temperature sensor 168C that can monitor associated temperature conditions in the engine 16. In addition, the engine module 168 can connect to (or hold resident) an engine combustion map 168D and can communicate with an ambient temperature sensor 168E. The engine module 168 can send the messages 182 over the system bus 162 that can include information from or about the above components that can be referenced by the traction control system 160, in whole or in part when switching drivetrain components between the active condition and the inactive condition.

Figure 7:
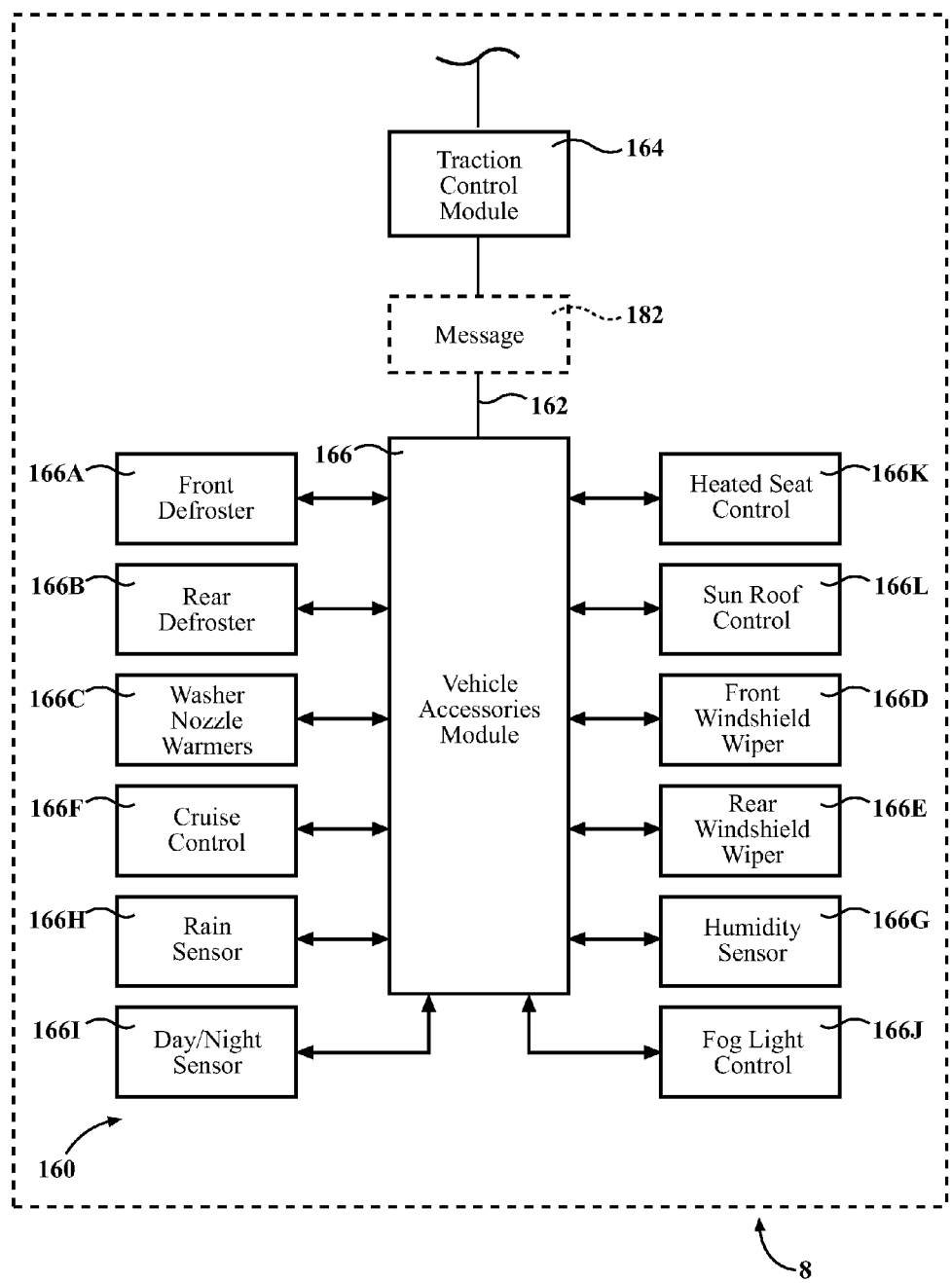
FIG. 7 is a diagram of the vehicle accessory module of FIG. 5 communicating with various sensors and systems of the motor vehicle.

With reference to FIG. 7, the vehicle accessories module 166 can connect to or communicate with various accessories that can be included with the vehicle 8. The vehicle 8 can have a front window defroster 166A, a rear window defroster 166B and/or washer nozzle warmers 166C. The user of the vehicle 8 can activate (or deactivate) the front window defroster 166A, the rear window defroster 166B and/the washer nozzle warmers 166C in, for example, inclement weather. The front window defroster 166A, the rear window defroster 166B and/or the washer nozzle warmers 166C can warm the windshield or the washer nozzles to reduce ice or condensation thereon.

The vehicle 8 can also include a front windshield wiper 166D and a rear windshield wiper 166E that the user can activate or deactivate. Moreover, the user can adjust a frequency at which the front and/or rear windshield wipers cycle, i.e., an intermittent wiping frequency.

The vehicle 8 can further include cruise control 166F. The cruise control 166F can be set by the user to hold the vehicle 8 at a certain speed. The cruise control 166F can be deactivated by manually adjusting the cruise control 166F or by braking of the vehicle 8 by means of a brake pedal (not shown). In addition, the user can adjust the speed at which the cruise control 166F maintains the vehicle 8.

The vehicle 8 can also include a humidity sensor 166G, a rain sensor 166H and a day/night sensor 166I. The humidity sensor 166G can detect a value descriptive of ambient humidity and changes thereto. The rain sensor 166H can detect whether the vehicle 8 is encountering precipitation and a rate thereof. The day/night sensor 166I can determine whether the vehicle 8 is operating during the day time or during the night time.

The vehicle 8 can include fog lights or other additional lights in addition to the regular driving and parking lights. The user can turn on or turn off the fog lights by way of a fog light control 166J. The vehicle 8 can also contain heated seats. The heated seats can be activated by the user who can adjust a heated seat control 166K to activate, deactivate and regulate the heated seats. The vehicle 8 can also include a sunroof or a moon roof that the user can control by way of a sun roof control 166L. The vehicle accessories module 166 can communicate the messages 182 over the system bus 162 that can include information from or about the above components that can be referenced by the traction control system 160, in whole or in part, when switching powertrain components between the active condition and the inactive condition.

Figure 8:
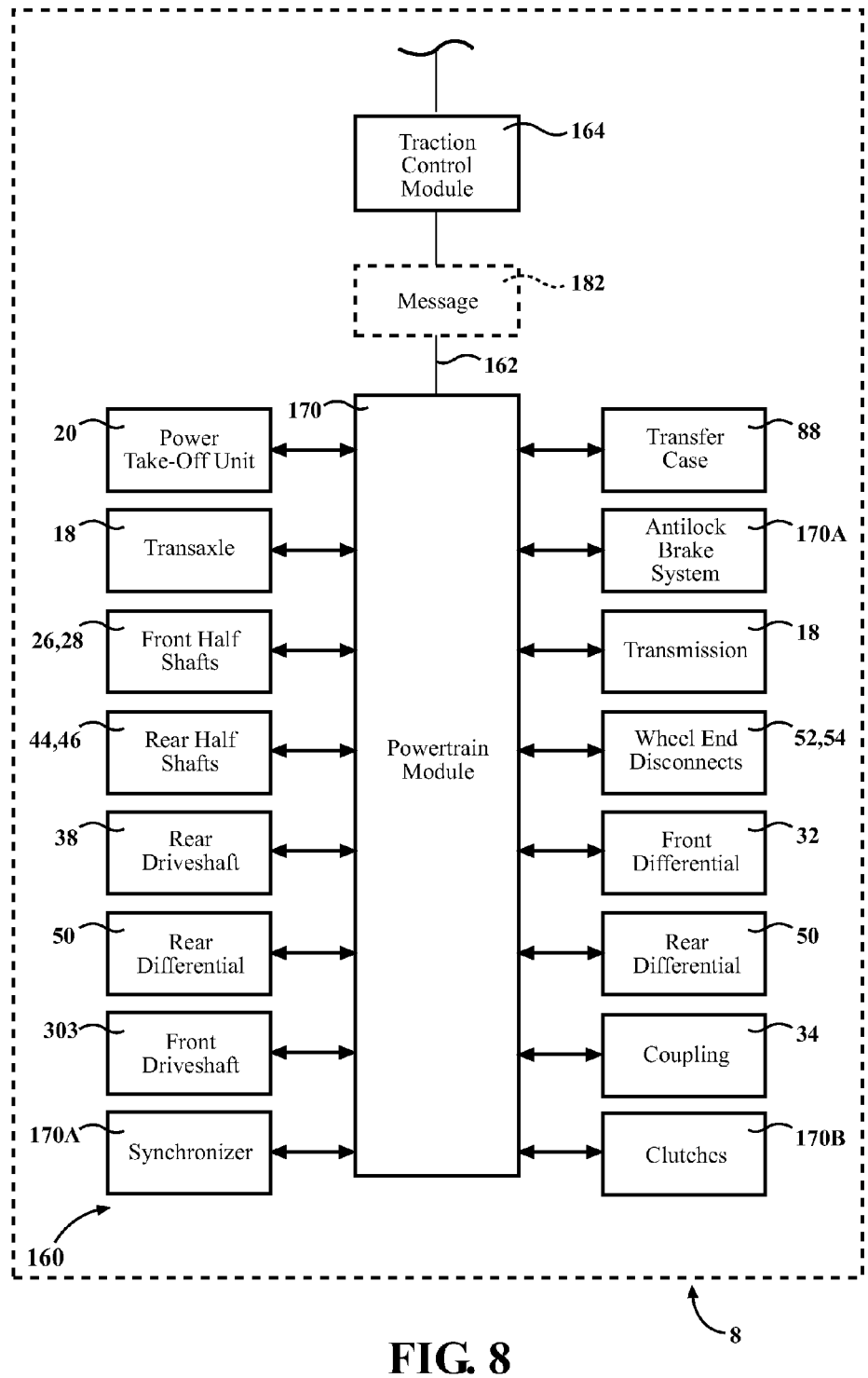
FIG. 8 is a diagram of the powertrain module associated with the traction control system shown in FIG. 5.

With reference to FIG. 8, the powertrain module 170 can connect to or communicate with various components and/or system that can be included with the vehicle 8. The vehicle 8 can have an anti-lock braking system 170A, as is known in the art. Briefly, the anti-lock braking system 170A can determine the wheels' rotational velocities and sufficient differences therebetween that can be indicative of slip. As with any of the modules 180, the powertrain module 170 can be capable of connecting to or communicating with one or more of the various suitable systems, controls, switches, assemblies, etc., on or associated with the vehicle 8 whether through the system bus 162 and/or through a direct connection (i.e., wired and/or wireless). In one aspect of the present teachings, the powertrain module 170 can be used across multiple vehicle models. In this regard, the powertrain module 170 or the modules 180 need not connect to everything with which the powertrain module 170 or the modules 180 can be configured to connect.

In addition, the powertrain module 170 can connect to and communicate with sensors associated with the front axleshafts, the rear axleshafts, wheel end disconnect device 52, 5A and transmission 18. The powertrain module 170 can also connect to front differential 32, rear differential 50 and one or more torque couplings 34. The powertrain module 170 can further connect to power take-off unit 20, transaxle 18, synchronizers 170A and one or more clutches 170B. The powertrain module 170 can communicate the messages 182 over the system bus 162 that can include information from or about the above components that can be referenced by the traction control system 160 in whole or in part, when switching powertrain components between the active condition and the inactive condition.

Figure 9:
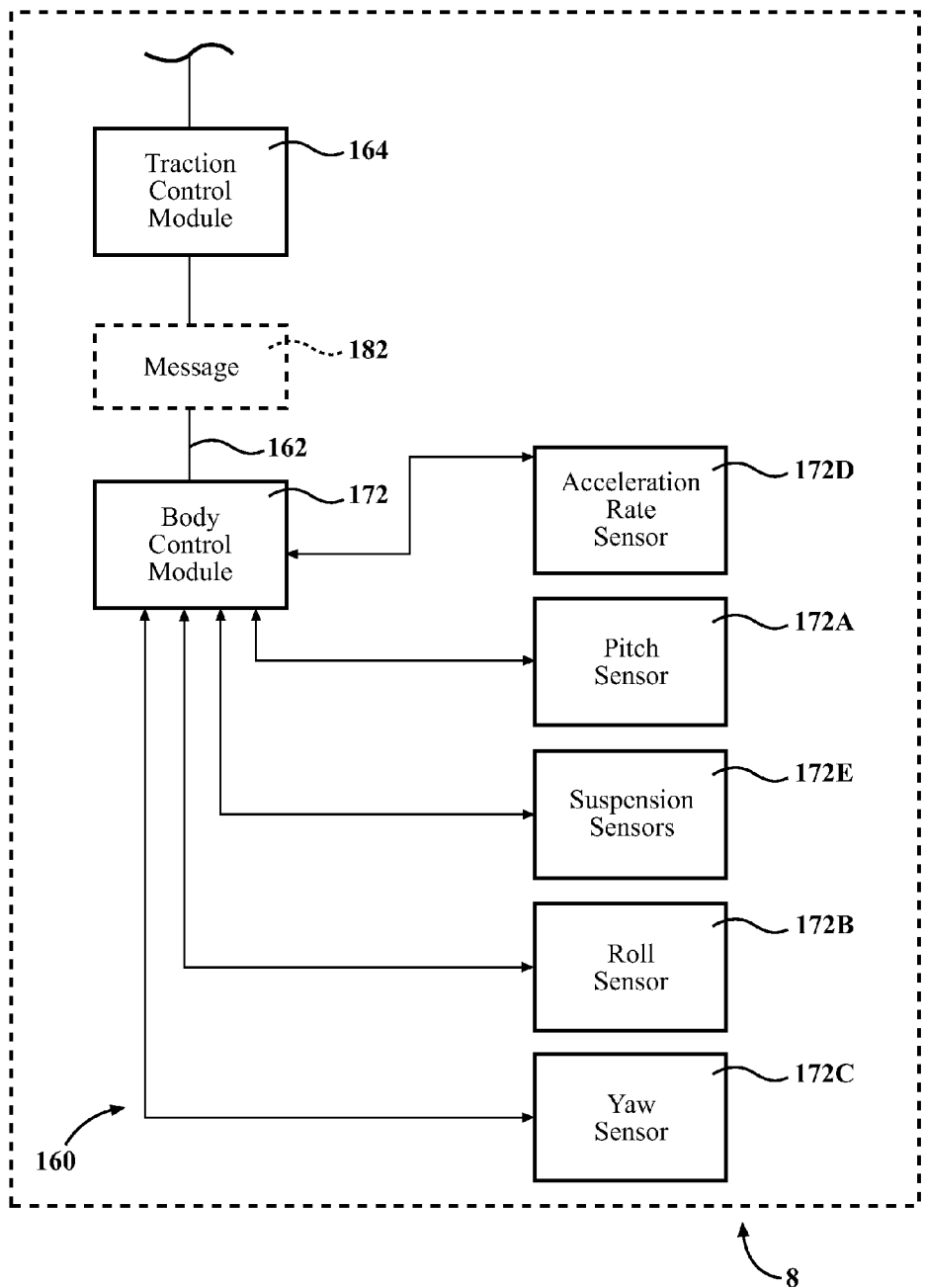
FIG. 9 is a diagram of the body control module associated with the traction control system shown in FIG. 5.

With reference to FIGS. 5 and 9, the body control module 172 can connect to or communicate with various sensors and/or systems that can be included with the vehicle 8. The vehicle 8 can include a pitch rate sensor 172A, a roll rate sensor 172B and a yaw rate sensor 172C. The pitch rate sensor 172A can determine a value descriptive of vehicle pitch and changes thereto during various vehicle maneuvers, such as, braking. The roll rate sensor 172B can determine a value descriptive of vehicle roll and changes thereto during various maneuvers, such as, an emergency lane change. The yaw rate sensor 172B can determine value descriptive of vehicle roll and changes thereto during various maneuvers, such as, emergency lane change. The yaw rate sensor 172C can determine a value descriptive of vehicle yaw and changes thereto during, for example, heavy braking or slip conditions. The pitch rate sensor 172A, the roll rate sensor 172B and the yaw rate sensor 172C can communicate the position of the vehicle 8 and changes thereto to the body control module 172.

In addition, the vehicle 8 can include an acceleration rate sensor 172D. The acceleration rate sensor 172D can determine the rate to the body control module 172. The vehicle 8 can also include one or more suspension sensors 172E that can detect travel (e.g., extension and/or compression) of the various suspension components and can communicate information about the vehicle suspension to the body control module 172. The body control module 172 can communicate the messages 182 on the system bus 162 that can include information from or about the above components that can be referenced by the traction control system 10, in whole or in part, when switching powertrain components between the active condition and the inactive condition.

Figure 10:
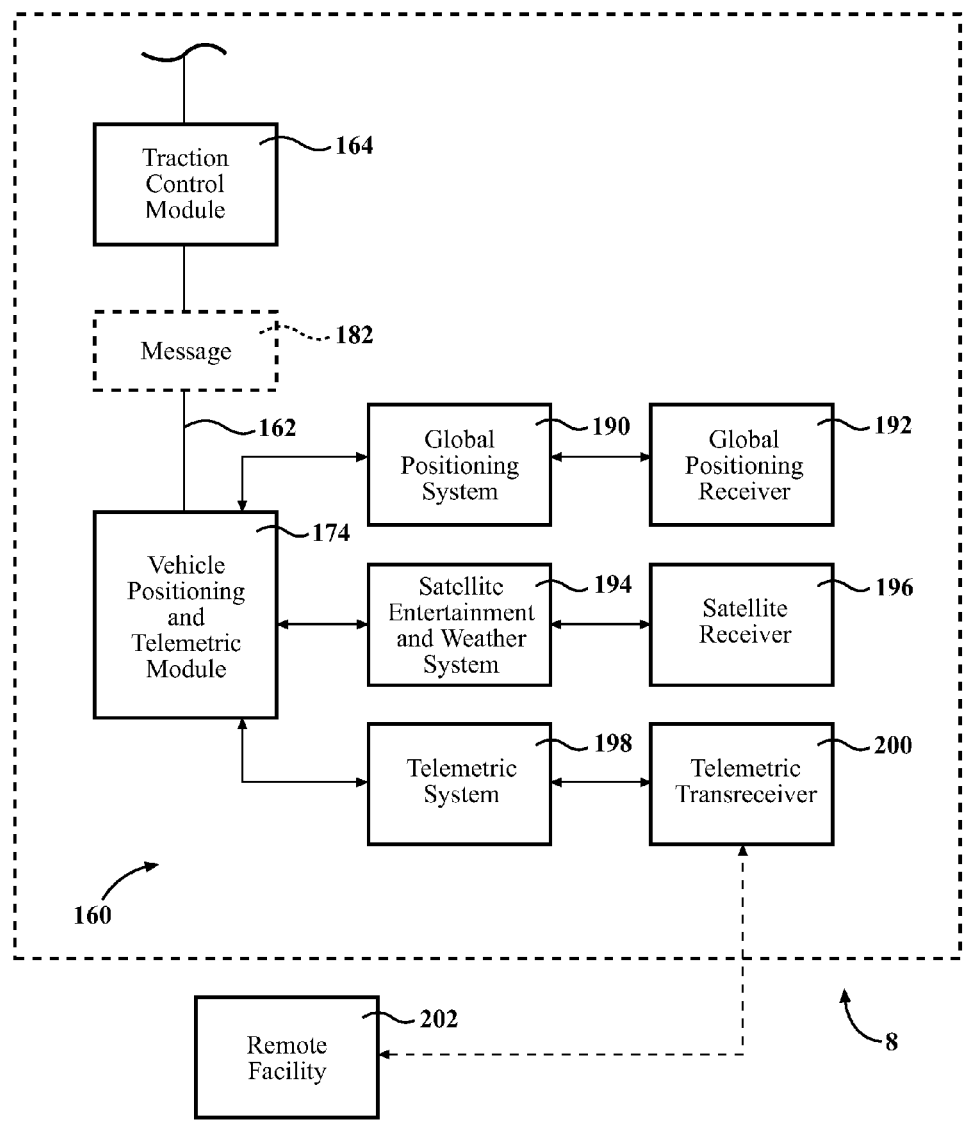
FIG. 10 is a diagram of the vehicle positioning, weather and telemetric module associated with the traction control system of FIG. 5.

With reference to FIG. 10, the vehicle positioning and telemetric module 174 can connect to or communicate with various components and/or systems that can be included with the vehicle 8. The vehicle 8 can include a global positioning system 190 having a global positioning satellite receiver 190 that can collect information from multiple global positioning satellites. The global positioning system 190 can also include geodetic information, road information, speed information and/or course variation information that can be relative to the vehicle 8. The geodetic information can include topographical and other geological information that can be relative to the position and/or future course of the vehicle 8. For example, road information can indicate that the vehicle 8 is traveling on unimproved or dirt roads. In other examples, the road information can indicate that the vehicle 8 can be traveling on highways, improved roadways, mountain switchbacks or windy roads that can have steep grades or tight turns. Speed information can indicate current speed, variations in speed and/or history of speed over a period. Course variation information can indicate, for example, deviation from a relatively straight course especially when road information does not correlate with the course change, e.g., quickly veering toward the shoulder of a road.

The vehicle 8 can also include a satellite entertainment and weather system 194 having a satellite receiver 196. By way of the satellite receiver 196, the satellite entertainment and weather system 194 can provide multimedia entertainment and weather to the vehicle 8 and its occupants. The satellite receiver 196 can communicate with satellites and/or terrestrial repeaters. The weather information can include current weather conditions and/or weather conditions that can be shortly encountered by the vehicle 8, e.g., up the road.

The vehicle positioning and telemetric module 174 can also communicate with a telemetric system 198. The telemetric system 198 can include a telemetric transreceiver 200 that can communicate with remote facilities 202 other vehicles and/or other parties. The telemetric system 198 can communicate maintenance, technical and/or other suitable information about the vehicle 8. The telemetric system 198 can communicate messages 182 on the system bus 162 that can include information from or about the above components and/or information received from any of the above satellites and/or repeaters that can be referenced by the traction control system 160, in whole or in part, when switching powertrain components between the active condition and the inactive condition.

With reference to FIG. 2, it will be appreciated by those skilled in the art that two or more of the modules 180 can be combined into a single module (e.g., a single multi-function module possibly having multiple submodules), that one or more of the modules 180 can be separated into multiple modules (i.e., more than two) communicating between one another and/or a combination thereof. For example, a single module can include and perform the functions of the traction control module 164, the engine module 168 and the powertrain module 170.

Furthermore, the traction control system 160 can include more or less of the modules 180 as required to provide desired functionality and the individual modules can contain more or less functionality than described herein. In this regard, the traction control system 160 can be configured such that it does not automatically activate or inactivate one or more drivetrain components based on messages generated by or in response to a particular module (e.g., day/night sensor FIG. 7.) and/or a particular switch (e.g., the heated seat control (FIG. 7)). Further yet, one or more of the modules 180 can be activated or deactivated or otherwise accessed remotely by wired or various forms of wireless electromagnetic wave communication.

As used herein, the term module, control module, component and/or device can refer to one or more of the following; an application specific integrated circuit (ASIC), an electronic circuit, a processor (shared, dedicated or group) and memory that executes one or more software or firmware programs, a combinational logic circuit and/or other suitable mechanical, electrical or electro-mechanical components that can provide the described functionality. Moreover, the modules 180 can communicate with other modules, devices, components, sensors or systems using digital and/or analog inputs and outputs and/or a suitable communications network by way of the above wired and/or wireless connection. The wired communication can use, in whole or in part, various forms of digital communication, for example, GMLAN, CAN or JLAN. The wired communication can also use, in whole or in part, various forms of analog communication.

Figure 11:
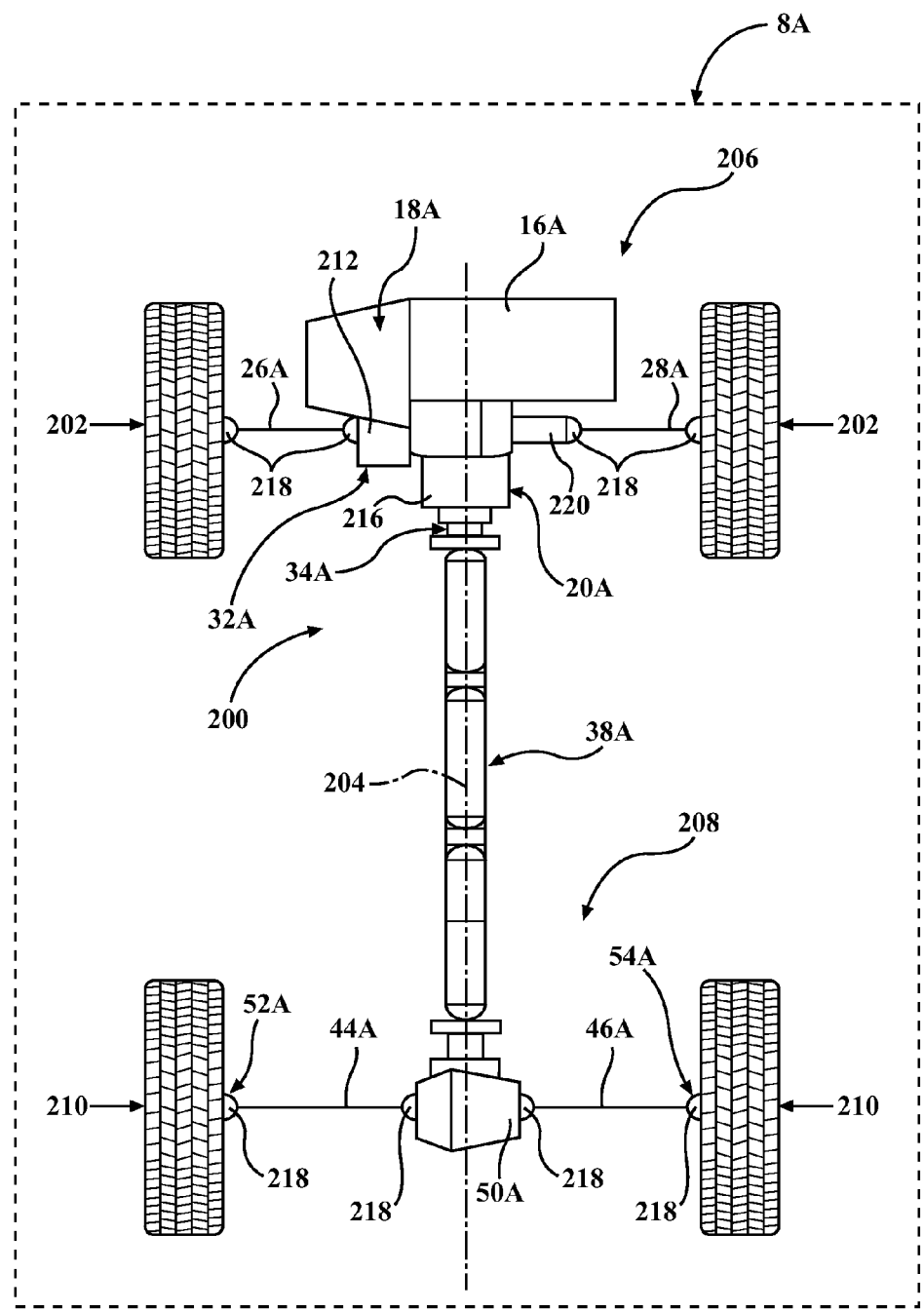
FIG. 11 is a diagram of an exemplary motor vehicle having an alternative drivetrain configuration and which is controlled by the traction control system of the present disclosure.

In one aspect of the present teachings and with references to FIG. 11, a vehicle 8A can include a powertrain 200 having the four or the all wheel drive configuration that typically directs more power to front wheels 202. The powertrain 200 can connect to an engine 16A that can be mounted transversely, i.e., generally perpendicular to a longitudinal axis 204 of the vehicle 30*a*. The powertrain 200 can include a front drivetrain 206 and a rear drivetrain 208. The front drivetrain 206 can include a transmission 18A that can be part of a transaxle. The front drivetrain 206 can deliver power from the engine 16A to the front wheels 202, while the rear drivetrain 208 can deliver power from a power take-off unit 20A to rear wheels 210 by way of multiple gear ratios of the transmission 18A.

The front drivetrain 206 includes the transaxle that can include a front differential 32A to direct power to front half shafts 26A, 28A of the front wheels 202, respectively. The front differential 32A can be housed in a differential housing 212 of the transaxle, while other portions of the transaxle can be housed in a main transaxle housing 214. The transaxle can connect to the power take-off unit 20A that can selectively direct power to the rear wheels 210 via a main driveshaft 38A. As such, the main driveshaft 38A can connect the transaxle to a rear differential 50A via the power take-off unit 20A. Rear half shafts 44A, 46A can extend from the rear differential 50A and thus can connect the rear wheels 210, respectively, to the transaxle.

The rear wheels 210 can have wheel end disconnects 52A, 54A which can be commonly referred to as hublocks. The wheel end disconnects 52A, 54A can permit the wheels 210 to be coupled to or uncoupled from the half shafts 44A, 46A respectively. By disconnecting the wheels 210 from the half shafts, the wheels 210 can spin independently of the half shafts and other components of the front and the rear drivetrains 206, 208.

The power take-off unit 20A can also include a coupling 34A that can be housed in a power take-off unit housing 216. The coupling 34A can couple and uncouple the transaxle to/from the main driveshaft 38A. When the main driveshaft 38A is uncoupled by the coupling 34A, the main driveshaft 38A can be in the inactive condition, which can also be referred to as idle or in an idle condition, because the main driveshaft 38A is no longer being driven by the engine 16A. Moreover, the wheel end disconnects 52A, 54A can disconnect the rear wheels 210 from the rear axleshafts and the coupling 34A can disconnect the main driveshaft 38A from the power take-off unit 20A. With both the main driveshaft 38A disconnected from the power take-off 20A and the rear wheels 210 disconnected from the rear axleshafts by the wheel end disconnect devices, the main driveshaft 38A, the rear differential 50A and the rear axleshafts can be idle, i.e., in the inactive condition.

As those skilled in the art will appreciate, the manner in which one or more drivetrain components idle, i.e., are in the inactive condition, is dependant upon its particular configuration. In some instances, the one or more components can rotate (e.g., can be back driven by one or more of the vehicle wheels) or can be stationary relative to the housing of the powertrain component. Accordingly, it will be appreciated that the powertrain components that are idle are not receiving rotary power to drive one or more of the vehicle wheels. It will also be appreciated, for example, that any savings realized by not delivering rotary power to the main driveshaft 38A would be reduced if the rear wheels 210 back drive the rear half shafts. Engine power and torque not directly consumed by the powering of the one or more components of the rear drivetrain 208, can nonetheless be consumed indirectly by the back driving of the one or more powertrain components by the rear wheels 210.

The coupling 34A can also reconnect the main driveshaft 38A to the transaxle. The wheel end disconnects 52A, 54A can also reconnect the rear wheels 210 to the rear axleshafts. In this regard, the synchronizers 170A (FIG. 8) can synchronize the speed of the components of the rear drivetrain 208 in the active condition to match rotational speeds of components in the active condition before re-coupling the components using suitable clutches 170B (FIG. 8), as is known in the art. Additionally, constant velocity joints 218 can be employed between the rear wheels 210, the real axleshafts and the rear differential 50A and/or between the front wheels 202, the front axleshafts and the transaxle. Furthermore, a front differential extension 220 can be employed to generally maintain the front axleshafts at generally an equal length.

Figure 12:
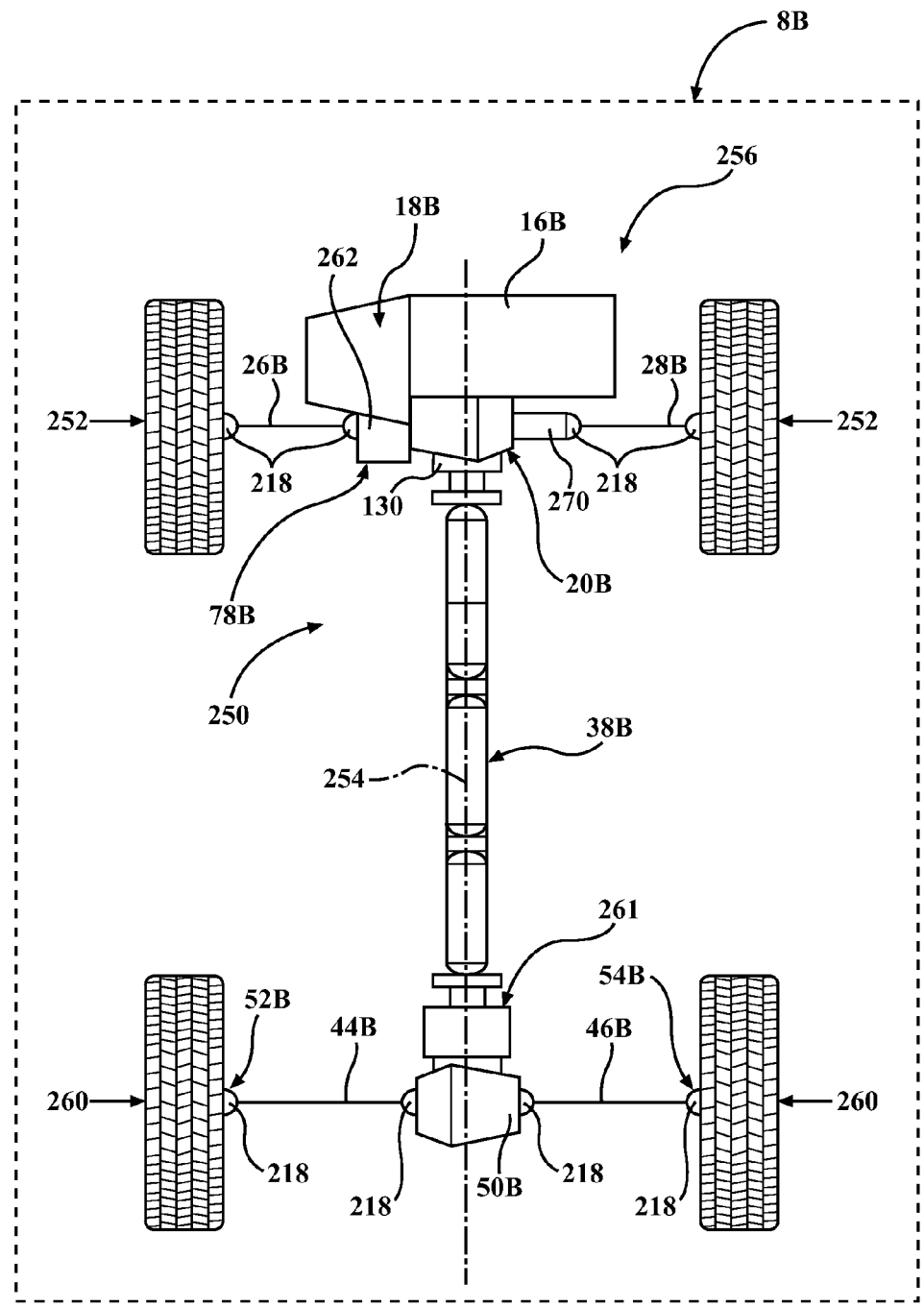
FIG. 12 is generally similar to FIG. 11 and shows another alternative configuration for the drivetrain.

In one aspect of the present teachings and with reference to FIG. 12, a vehicle 8B can include a powertrain 250 having the four or the all wheel drive configuration that typically directs more power to front wheels 252. The powertrain 250 can connect to an engine 16B that can be mounted transversely, i.e., generally perpendicular to a longitudinal axis 254 of the vehicle 30b. The powertrain 250 can include a front drivetrain 256 and a rear drivetrain 258. The front drivetrain 256 can include a transmission 18B that can be part of a transaxle. The front drivetrain 256 can deliver power from the engine 16B to the front wheels 252, while the rear drivetrain 258 can deliver power from a power take-off unit 20B to rear wheels 260 by way of multiple gear ratios of the transmission. (0049) The vehicle 8B can be similar to vehicle 8A, as illustrated in FIG. 11, but a coupling 261 can be between a rear differential 50B and a main driveshaft 38B and not between the power take-off unit 20A and the main driveshaft 38A as shown in FIG. 11.

When the main driveshaft 38B is disconnected from the rear differential 50B by the coupling 261 and the rear wheels 260 are disconnected from the rear axleshafts by wheel end disconnects 52B, 54B, the rear differential 50B and the rear axleshafts can be idle or be in the inactive condition. The coupling 261 can also reconnect the main driveshaft 38B to rear differential 50B and the wheel end disconnects 52B, 54B can reconnect the rear wheels 210 to the real axleshafts. Activation of coupling 261 is controlled by control system 104.

Figure 13:
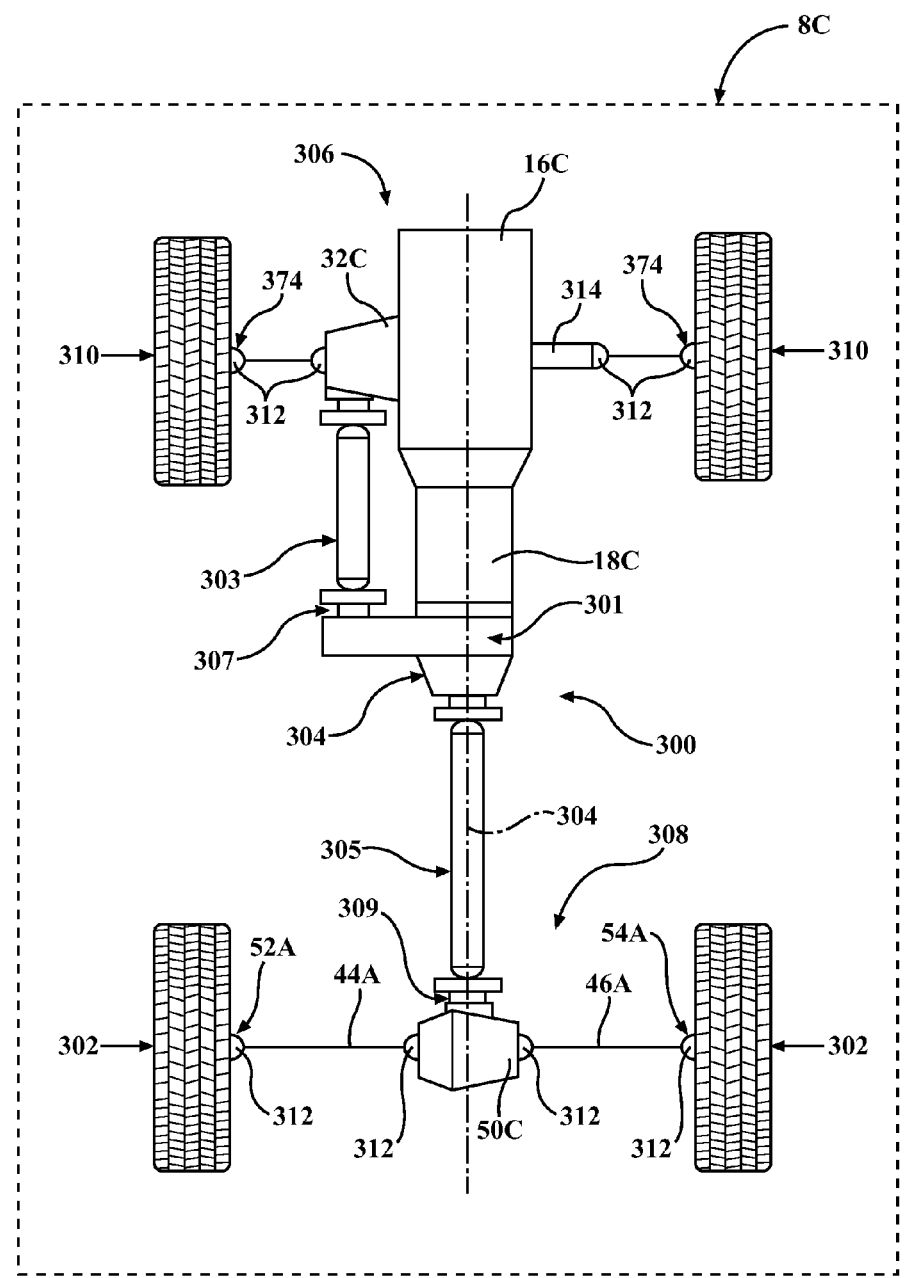
FIG. 13 is a schematic diagram of a rear-wheel based fourwheel drive vehicle equipped with a transfer case and controlled utilizing the traction control system of the present disclosure.
Figure 14:
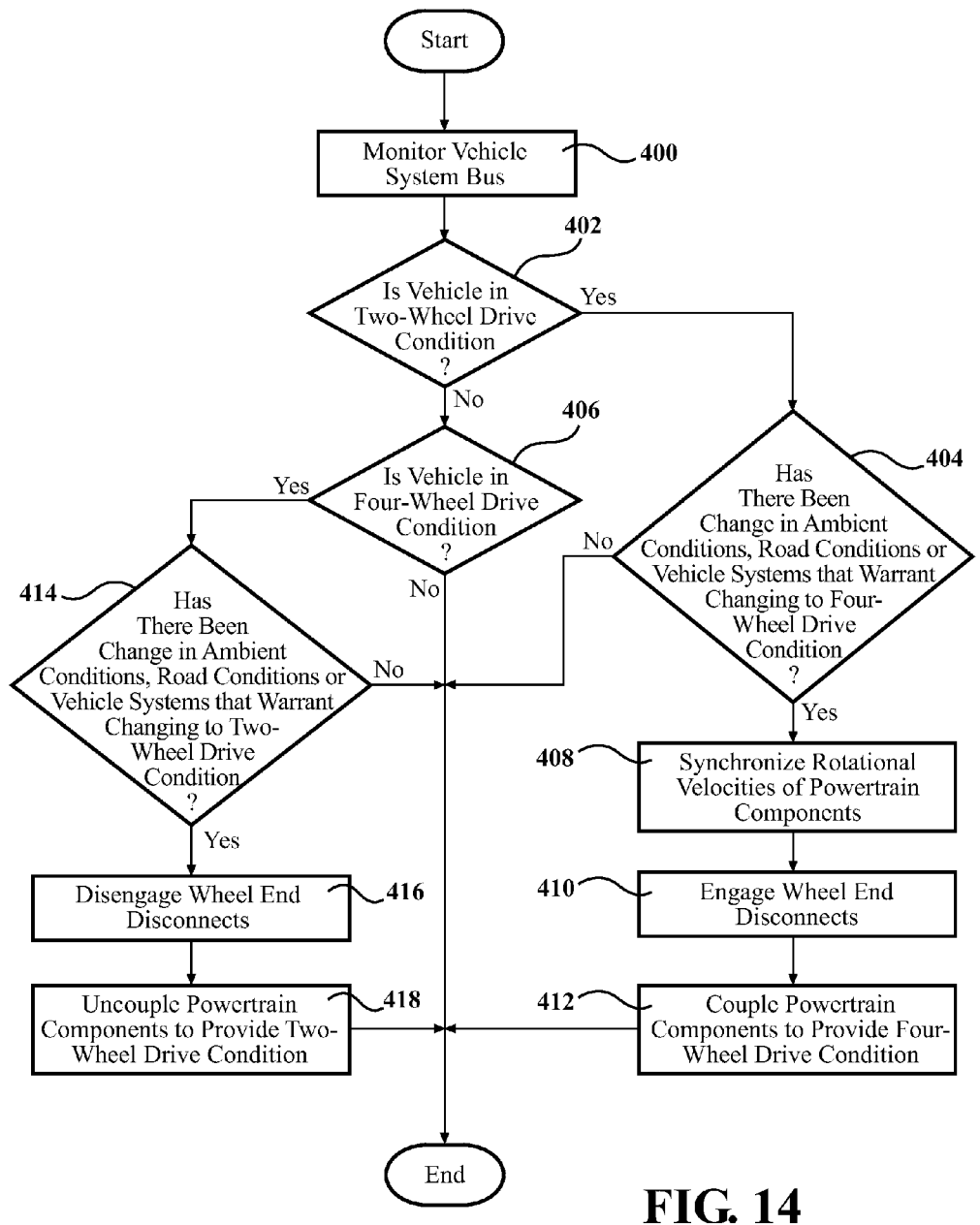
FIGS. 14-18 illustrate flow charts for the method of controlling the traction control system of the present disclosure.

In a further aspect of the present teachings and with reference to FIG. 13, a vehicle 8C can include a powertrain 300 having the four or the all wheel drive configuration that typically directs more power to rear wheels 302. The powertrain 300 can connect to an engine 16C that can be mounted longitudinally, i.e., generally parallel to a longitudinal axis 304 of the vehicle 8C. The powertrain 300 can include a front drivetrain 306 and a rear drivetrain 308. The front drivetrain 306 can include a transmission 18C that can connect to a transfer case 301. The transfer case 301 can connect to a front driveshaft 303 and a rear driveshaft 305.

The front driveshaft 303 can connect to a front differential 32C while rear driveshaft 305 can connect to rear differential 50C.

A coupling 307 can be housed in or associated with the transfer case 301 and can couple and can uncouple the front driveshaft 303 to/from the transfer case 301. In addition, wheel end disconnects 374 can disconnect the front wheels 310 from the front axleshafts that can extend from the front differential 32C. With the front wheels 310 disconnected from the front axleshafts and the front driveshaft 303 disconnected from the transfer case 301, the front differential 32C, the front axleshafts and the front driveshaft 303 can be idle or be in the inactive condition.

The front wheel end disconnects 374 and the coupling 307 can reengage the front driveshaft 303, the front differential 32C and the front half shafts and, thus, restore the above components to the active condition. When doing so, the rotational velocities of the various components of the powertrain 300 can be generally matched using synchronizers (FIG. 8). Furthermore, the vehicle 8C can include constant, velocity joints 312 that can be employed between the rear wheels 302, the rear axleshafts and the rear differential 50C and/or between the front wheels 310, the front axleshafts and the front differential 32C.

In further examples, a second coupling 309' can be used in tandem with the wheel end disconnects 52C on the rear wheels 302 to switch components of the rear drivetrain 308 between the active or the inactive condition. In this regard, the coupling 309' can be between the rear driveshaft 305 and the transfer case 301. As such, the rear driveshaft 305, the rear differential 50C and the rear axleshafts can be placed in the active and the inactive condition. As an option, coupling 309' can be connected between rear driveshaft 305 and rear differential 50C.

In further examples, additional couplings can be used in tandem with the wheel end disconnects 52, 54 on the rear wheels 302 to switch components of the rear drivetrain 308 between the active or the inactive condition. When the coupling 309 is between the rear driveshaft 305 and the transfer case 301, the rear driveshaft 305, the rear differential 50C and the rear axleshafts 44, 46 can be switched between the active and the inactive conditions. When the coupling 309' is between the rear driveshaft 305 and the rear differential 50C, the rear differential 50C and the rear axleshafts 44, 46 can be switched between the active and the inactive conditions.

In one aspect of the present teachings and with reference to FIGS. 5 and 8-13, the traction control system 160 can determine when to automatically couple or uncouple one or more components of the drivetrain 200, 250, 300, to thus switch the one or more components between the active or the inactive condition. For example, control system 104 can monitor the vehicle system bus 162, as illustrated in step 400. In step 402, control can determine whether the vehicle is in a two wheel drive condition, thus one or more components of the drivetrain 200, 250, 300 are idle, i.e., are in the inactive condition. Control can determine that the vehicle is in the two wheel drive condition by monitoring the powertrain module 170 over the system bus 162. When control determines that the vehicle is in the two wheel drive condition, control can continue in step 404. When control determines that the vehicle is not in the two wheel drive condition, control can continue in step 406.

In step 404, control can determine whether there has been a change in one or more ambient conditions, road conditions and/or changes to one or more components and/or systems of the vehicle that warrants changing from the two wheel condition to the four wheel or all wheel drive condition.

When control determines that there has been the change in one or more of the ambient conditions, the road conditions and/or the changes to one or more of the vehicle systems that warrants changing to the four wheel drive condition, control can continue in step 408. When control determines that there has not been the change in one or more of the ambient conditions, the road conditions and/or the changes to one or more of the vehicle systems that warrants changing to the four wheel drive condition, control can end.

In step 408, control can synchronize rotational velocities of the one or more components of the drivetrain. For example, the traction control system 160 can generally match the rotational velocity of the front drivetrain to the rotational velocity of the power take-off unit or the transfer case. In step 410, control can engage the wheel end disconnects that can couple the front drivetrain to the front wheels. In step 412, control can couple the components of the drivetrain that were uncoupled to provide the four wheel or all wheel condition and thus restore all of the drivetrain components to the active condition.

In step 406, control can determine whether the vehicle is in the four wheel or all wheel drive condition and therefore all of the components of the drivetrain are in the active condition by, for example, monitoring the powertrain module 170 on the system bus 162. When control determines that the vehicle is in the four wheel or all wheel drive condition, control can continue in step 414. When control determines that the vehicle is not in the four wheel or all wheel drive condition, control can end.

In step 414, control can determine whether there has been a change in one or more ambient conditions, road conditions and/or changes to one or more vehicle systems that warrant changing from the four wheel or all wheel condition to the two wheel drive condition. When control determines that there has been the change in one or more of the ambient conditions, the road conditions and/or the changes to one or more of the vehicle systems that warrants changing to the two wheel drive condition, control can continue in step 416. When control determines that there has not been the change in one or more of the ambient conditions, the road conditions and/or the changes to one or more of the vehicle systems that warrants changing to the four wheel drive condition, control can end.

In step 416, control can disengage the wheel end disconnects that can uncouple the front drivetrain from the front wheels and/or can uncouple the rear drivetrain from the rear wheels. In step 418, control can uncouple the components of the drivetrain that were coupled to provide the two wheel drive condition and thus place one or more components of the drivetrain in inactive condition. From step 418, control can end.

Figure 15:
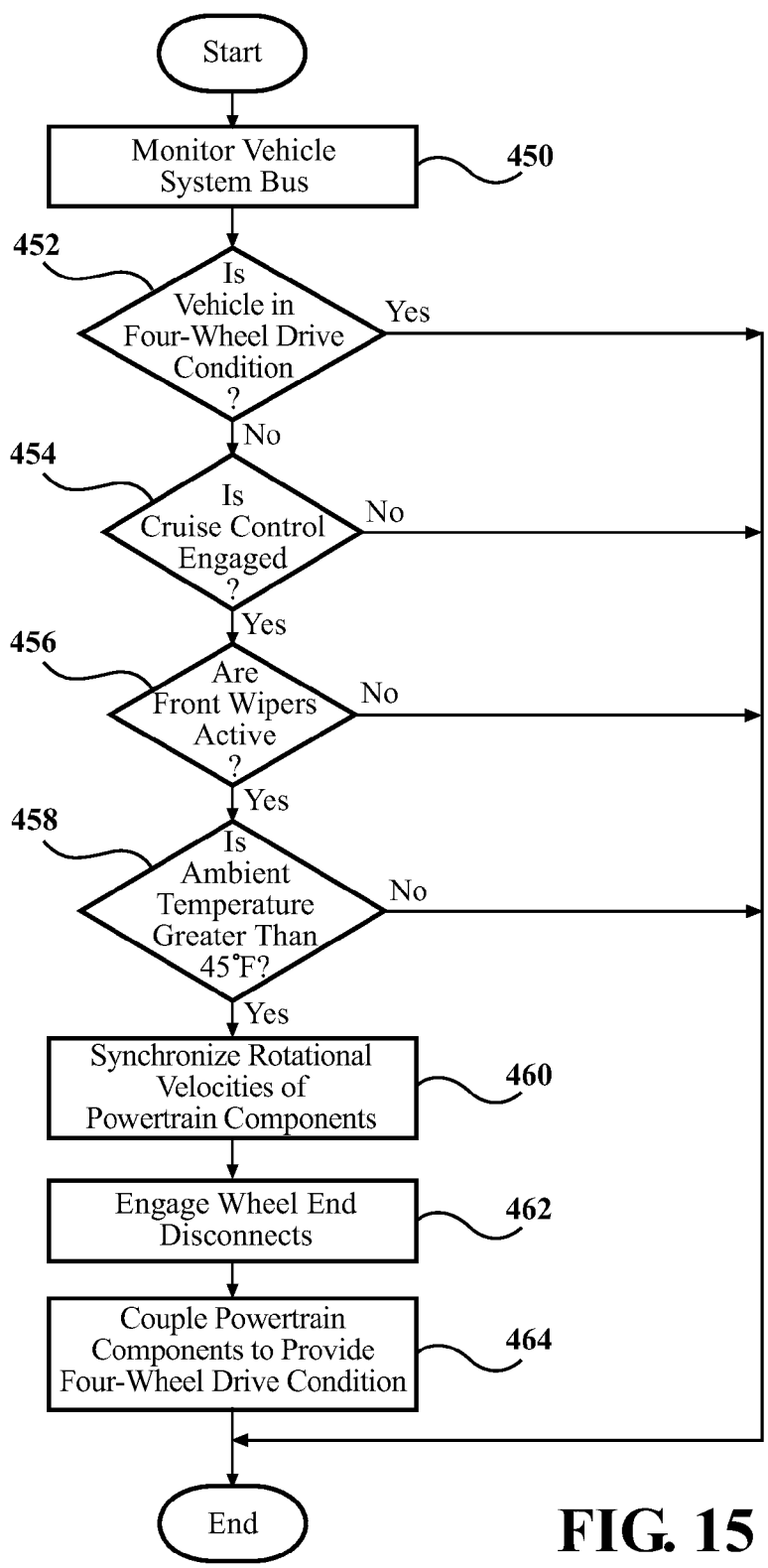

In a further aspect of the present teachings, the traction control system 160 can determine when to switch one or more components of the drivetrain between the active or the inactive condition. In one example, control system 104 can monitor the vehicle system bus, as illustrated in step 450 of FIG. 15. In step 452, control can determine whether the vehicle is in the four wheel or the all wheel drive condition such that all of the components of the drivetrain are in the active condition. When control determines that the vehicle is in the four wheel or all wheel drive condition, control can end. When control determines that the vehicle is not in the four wheel or all wheel drive condition, i.e., is in the two wheel drive condition, control can continue in step 454.

In step 454, control can determine whether the cruise control 166F (FIG. 7) is engaged. When control determines that the cruise control 166F is not engaged, control can end.

When control determines that the cruise control 166F is engaged, control can continue with step 456. In step 456, control can determine whether the front windshield wipers 166D (FIG. 7) are active. When control determines that the front windshield wipers 166D are not active, control can end. When control determines that the front windshield wipers 166D are active, control can continue in step 458.

In step 458, control can determine whether the ambient temperature is in greater than 45° F. (7.2° C.). Control can determine the ambient temperature by, for example, receiving information from the ambient temperature sensor 168E from the engine module 168. When control determines that the ambient temperature is not greater than 45° F., control can end. When control determines that the ambient temperature is greater than 45° F., control can continue in step 460.

In step 460, control can synchronize rotational velocities of the one or more components of the drivetrain. In step 462, control can engage the wheel end disconnects that can couple the front drivetrain to the front wheels and/or can couple the rear drivetrain to the rear wheels. In step 464, control can couple the components of the drivetrain that were uncoupled to provide the four wheel or all wheel condition and thus restore all of the drivetrain components to the active condition. From step 464, control can end.

Figure 16:
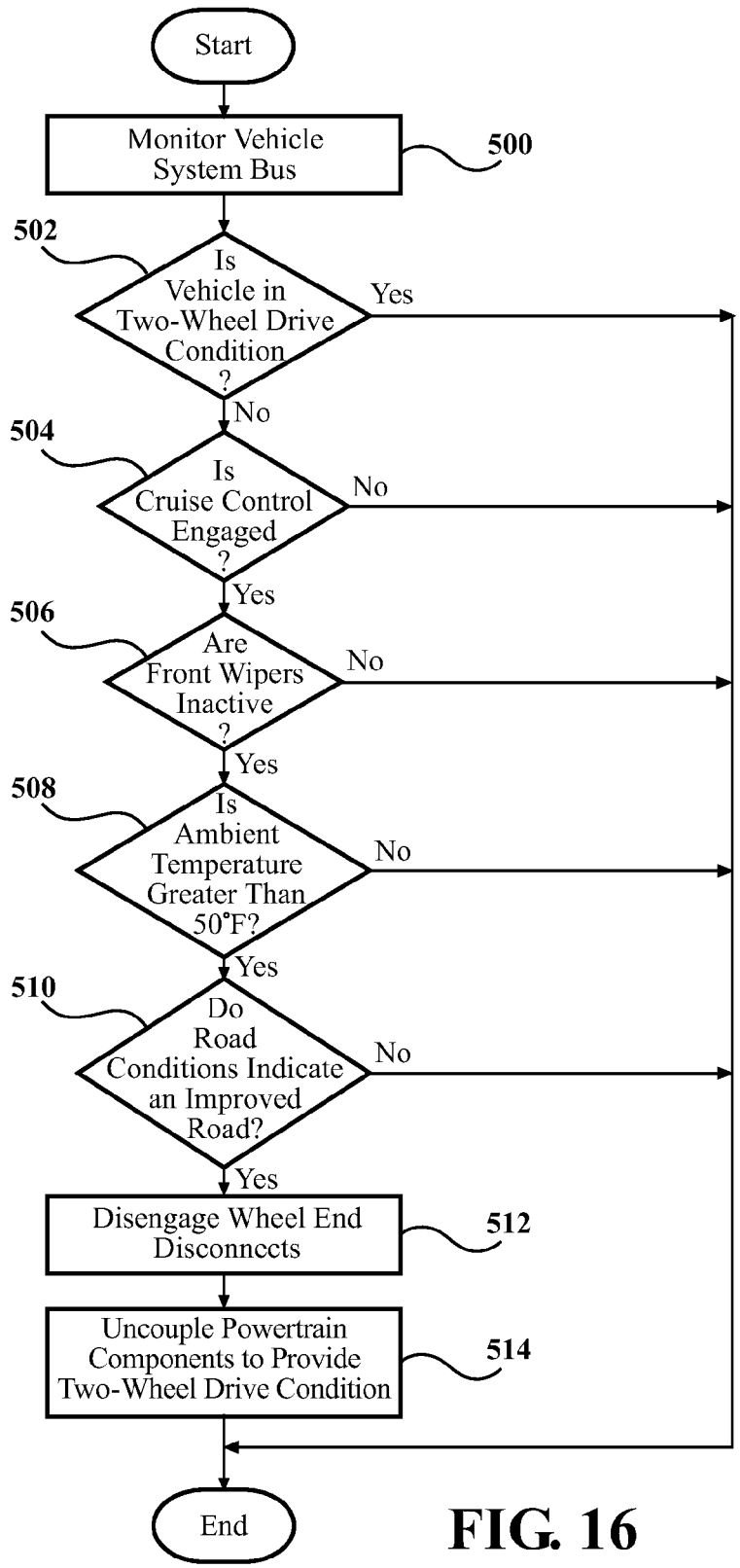

In a further aspect of the present teachings and with reference to FIG. 16, the traction control system 160 can determine when to switch one or more components of the drivetrain between the inactive and the active conditions. In one example, control can monitor the vehicle system bus, as illustrated in step 500. In step 502, control can determine whether the vehicle is in the two wheel drive condition, i.e., one or more components of the drivetrain are in the inactive condition. When control determines that the vehicle is in the two wheel drive condition control can end. When control determines that the vehicle is not in the two wheel drive condition, control can continue in step 504.

In step 504, control can determine whether the cruise control 166F (FIG. 7) is engaged. When control determines that the cruise control is not engaged, control can end. When control determines that the cruise control is engaged, control can continue in step 506. In step 506, control can determine whether the front windshield wipers 166D (FIG. 7) are inactive. When control determines that the front windshield wipers are not inactive control can end. When control determines that the front windshield wipers are inactive control can continue in step 508. In step 508, control can determine whether the ambient temperature is greater than 50° F. (10° C.). When control determines that the ambient temperature is not greater than 50° F., control can end. When control determines that the ambient temperature is greater than 50° F., control can continue in step 510.

In step 510, control can determine whether road conditions indicate that the vehicle is driving on an improved road, e.g., an interstate highway. Control can determine that the vehicle is driving on the improved road by referencing road condition via camera system 110 and road analysis module 108 and/or geodetic information from the global positioning system 174 (FIG. 10) that can further include current map and/or construction information. When control determines that the vehicle is not driving on an improved road, control can end. When control determines that the vehicle is driving on an improved road, control can continue in step 512.

In step 512, control can disengage the wheel end disconnects that can uncouple the front drivetrain from the front wheels and/or can uncouple the rear drivetrain from the rear wheels. In step 514, control can uncouple the components of the drivetrain to provide the two wheel drive condition and thus place one or more components of the drivetrain in an inactive condition. From step 514, control can end.

Figure 17:
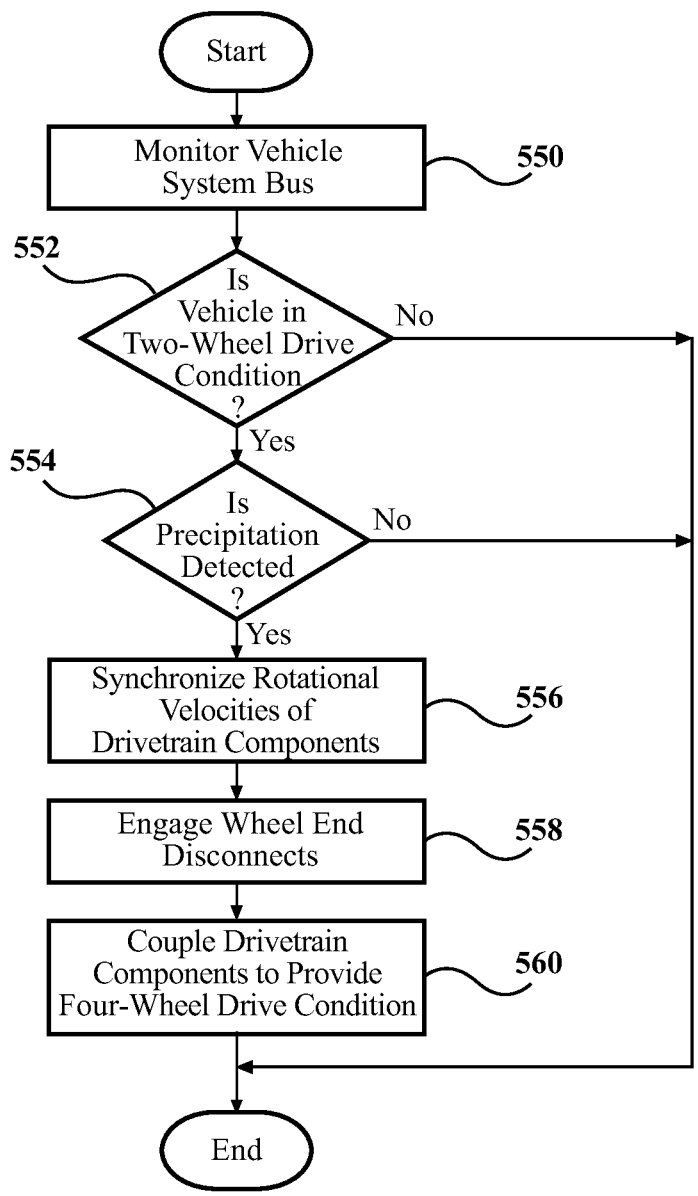

In yet another aspect of the present teachings and with reference to FIG. 17, the traction control system 160 can determine when to switch one or more components of the drivetrain between the inactive and the active condition. In one example, control can monitor the vehicle system bus 162, as illustrated in step 550. In step 552, control can determine whether the vehicle is in the two wheel drive condition, i.e., the one or more components of the drivetrain are in the inactive condition. When control determines that the vehicle is in the two wheel drive condition control can end. When control determines that the vehicle is not in the two wheel drive condition, control can continue in step 554.

In step 554, control can determine whether the vehicle is encountering precipitation. Visual data from camera system 110 may provide this information. When control determines that the vehicle is not encountering precipitation, control can end. When control determines that the vehicle is encountering precipitation, control can continue in step 556. In step 556, control can synchronize rotational velocities of the one or more components of the drivetrain. In step 558, control can engage the wheel end disconnects that can couple the front drivetrain to the front wheels and/or can couple the rear drivetrain to the rear wheels. In step 560, control can couple the components of the drivetrain to provide the four wheel or all wheel condition and thus restore all of the drivetrain components to the active condition. From step 560, control can end.

Figure 18:
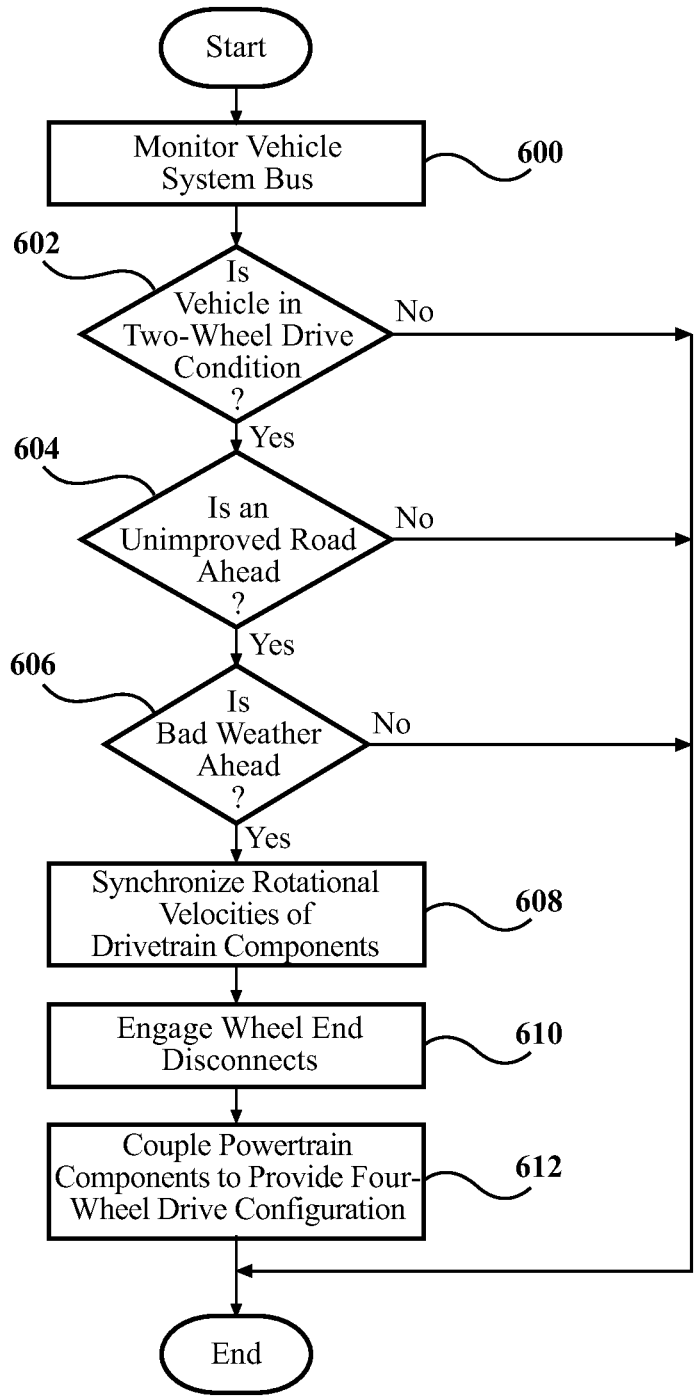

In another aspect of the present teachings and with reference to FIG. 18, the traction control system 160 can determine when to switch components of the drivetrain between the active condition and the inactive condition. In one example, control can monitor the vehicle system bus, as illustrated in step 600. In step 602, control can determine whether the vehicle is in the two wheel drive condition, i.e., one or more components of the drivetrain are in the inactive condition. When control determines that the vehicle is not in the two wheel drive condition control can end. When control determines that the vehicle is in the two wheel drive condition, control can continue in step 604.

In step 604, control can determine whether the vehicle is about to encounter an unimproved road, e.g., a dirt road or a seasonal road. This information can be provided by the visual data from camera system 110. When control determines that the vehicle is not about to encounter an unimproved road, control can end. When control determines that the vehicle is about to encounter an unimproved road, control can continue in step 606.

In step 606, control can determine whether the vehicle is about to encounter bad weather. Control can determine that the vehicle is about to encounter bad weather by, for example, correlating a position of the vehicle obtained from the global positioning system with weather information from the entertainment and weather system. When the control determines that the vehicle is not about to encounter bad weather, control can end. When the control determines that the vehicle is about to encounter bad weather, control can continue in step 608.

In step 608, control can synchronize rotational velocities of the one or more components of the drivetrain. In step 610, control can engage the wheel end disconnects that can couple the front drivetrain to the front wheels and/or can couple the rear drivetrain to the rear wheels. In step 612, control can couple the components of the drivetrain to provide the four wheel or the all wheel condition and thus restore all of the drivetrain components to the active condition. From step 612, control can end.

While specific aspects have been described in the specification and illustrated in the drawings, it will be understood by those skilled in the art that various changes can be made and equivalence can be substituted for elements thereof without departing from the scope of the present teachings, as defined in the claims. Furthermore, the mixing and matching of features, elements and/or functions between various aspects of the present teachings is expressly contemplated herein so that one skilled in the art will appreciate from the present teachings that features, elements, components, modules and/or functions of one aspect of the present teachings can be incorporated into another aspect as appropriate unless described otherwise above. Moreover, many modifications can be made to adapt a particular situation, configuration or material to the present teachings without departing from the essential scope thereof. Therefore, it can be intended that the present teachings not be limited to the particular aspects illustrated by the drawings and described in the specification as the best mode presently contemplated for carrying out the present teachings but that the scope of the present teachings will include many aspects and examples following within the foregoing description and the appended claims.

What is claimed is:

1. A vehicle drivetrain for transferring torque from a powertrain to a first and second sets of wheels, the drivetrain comprising:
   a first driveline being adapted to transfer torque to the first set of wheels and including a first power disconnection device for adjusting the amount of torque transferred to at least one of the sets of wheels;
   a second driveline being adapted to transfer torque to the second set of wheels and including a second power disconnection device for adjusting the amount of torque transferred to at least one of the sets of wheels;
   a camera system including at least one camera mounted to the vehicle for acquiring visual data;
   a road analysis module electrically connected with said camera system and configured to receive the acquired visual data from said camera and to calculate a coefficient of friction between tires of the vehicle and a road surface based on said processed visual data; and
   a controller electrically connected with said first and second power disconnection devices and said road analysis module and configured to control actuation of said first and second power disconnection devices based on said coefficient of friction determined by said road analysis module;
   wherein said camera is further configured to transmit visual data to a vehicle control system that is separate from said road analysis module.

2. The drivetrain as set forth in claim 1 wherein said camera system further includes an image processing unit for processing said visual data acquired by said camera and sending said processed visual data to said road analysis module.

3. The drivetrain as set forth in claim 2 further including at least one sensor mounted on the vehicle for measuring at least one driving characteristic of the vehicle, and said at least one sensor electrically connected with said controller to further control said actuation of said first and second power disconnection devices based on said driving characteristic measured by said sensor.

4. The drivetrain as set forth in claim 3 wherein said driving characteristic measured by said sensor is at least one of drive mode status and wheel slip.

5. The drivetrain as set forth in claim 1 further including a power take-off unit for transmitting drive torque from the powertrain, said second driveline further including a rear axle assembly having a first rear axleshaft and a second rear axleshaft each connected to a wheel of the second set of wheels, said second driveline further including a propeller shaft interconnecting said power takeoff unit and said rear axle assembly for transmitting torque from said power take-off unit to said rear axle assembly to provide rotary movement to said second set of wheels.

6. The drivetrain as set forth in claim 5 wherein said first power disconnection device is adjustably connected to said propeller shaft of said second driveline for drivingly connecting and disconnecting said propeller shaft of said second driveline from the power take-off unit.

7. The drivetrain as set forth in claim 1 further including a vehicle readiness system configured to determine at least one of a sudden direction change and air bag deployment, and wherein said vehicle readiness system is electrically connected with said controller such that said controller further controls said actuation of said first and second power disconnection devices based on said sudden direction change or said air bag deployment of the vehicle determined by said vehicle readiness system.

8. The drivetrain as set forth in claim 1 further including a driver information center electrically connected with said controller, and wherein said controller further controls said actuation of said first and second power disconnection devices based on attributes of the vehicle determined by said driver information system.

9. The drivetrain as set forth in claim 1 wherein the vehicle control system is an accident avoidance system.

10. The drivetrain as set forth in claim 1 further including at least one of a global positioning system and a satellite weather system and wherein said controller further controls actuation of said first and second power disconnection devices based on readings from said at least one of a global positioning system and satellite weather system.

11. A method for controlling a drivetrain of a vehicle for transferring torque from a powertrain to a first and second set of wheels and including a first power disconnection device and a second power disconnection device each for adjusting the amount of torque transferred to at least one of the sets of wheels, said method comprising:
collecting visual data from a camera mounted to the vehicle as the vehicle travels across a road surface;
transmitting the visual data captured by the camera to a road analysis module;
processing the visual data captured by the camera with the road analysis module to calculate a coefficient of friction between tires of the vehicle and a road surface;
transmitting the calculated coefficient of friction to a controller;
actuating at least one of the first and second power disconnection devices with the controller based on the coefficient of friction determined by the road analysis module to adjust the amount of torque transferred to at least one of the wheels to prevent slipping of the wheels; and
transmitting the visual data from the camera to a vehicle control system that is separate from the road analysis module.

12. The method as set forth in claim 11 wherein the controller further actuates the at least one of the first and second power disconnection devices based on at least one driving characteristic of the vehicle measured by at least one sensor mounted on the vehicle.

13. The method as set forth in claim 12 wherein the driving characteristic measured by the at least one sensor includes at least one of drive mode status and wheel slip.

14. The method as set forth in claim 11 wherein said step of processing the visual data captured by the camera system with a road analysis module to calculate a coefficient of friction includes categorizing the visual data into distinct types of images, and comparing the categorized visual data to known road conditions.

15. The method as set forth in claim 14 further including determining CAN system operating parameters, and determining direct drive control inputs, and wherein said step of actuating at least one of the first and second power disconnection devices to adjust the amount of torque transferred to at least one of the wheels to prevent slipping of the at least one of the wheels is further based on the CAN system operating parameters, and the direct drive control inputs.

16. The method as set forth in claim 11 wherein said step of actuating at least one of the first and second power disconnection devices with the controller includes determining whether one or more components of the first and second driveline are in an active condition or inactive condition, wherein the components are in the active condition when connected to the powertrain and in the inactive condition when disconnected from the powertrain, and shifting the components between the active and inactive conditions based on at least the coefficient of friction determined by the road analysis module to prevent the wheels from slipping.

17. The method as set forth in claim 11 wherein the vehicle control system is an accident avoidance system.

18. The method as set forth in claim 11 wherein the first and second power disconnection devices are further actuated based on readings from at least one of a global positioning system and a satellite weather system.

19. The method as set forth in claim 11 wherein the first and second power disconnection devices are further activated based on readings from a sensor determining at least one of weather conditions, proximity of the vehicle to other vehicles, an altitude change along the road, and a course change different from the road.

20. A method for controlling a drivetrain of a vehicle for transferring torque from a powertrain to a first and second set of wheels and including a first power disconnection device and a second power disconnection device each for adjusting the amount of torque transferred to at least one of the sets of wheels, said method comprising:
collecting visual data from a camera mounted to the vehicle as the vehicle travels across a road surface;
transmitting the visual data captured by the camera to a road analysis module;
processing the visual data captured by the camera with the road analysis module to calculate a coefficient of friction between tires of the vehicle and a road surface;
transmitting the calculated coefficient of friction to a controller;
modifying the conditions prerequisite to actuating the first and second power disconnection devices with the controller to thereby modify the conditions prerequisite to entering one of a two wheel drive mode or an all-wheel drive mode to bias one of the two wheel dive mode or all-wheel drive mode as more likely than the other based on the calculated coefficient of friction; and
transmitting the visual data from the camera to an accident avoidance system that is separate from the road analysis module.

* * * * *